US012537302B2

(12) United States Patent
Wu

(10) Patent No.: US 12,537,302 B2
(45) Date of Patent: Jan. 27, 2026

(54) ANTENNA ASSEMBLY AND ELECTRONIC DEVICE

(71) Applicant: GUANGDONG OPPO MOBILE TELECOMMUNICATIONS CORP., LTD., Guangdong (CN)

(72) Inventor: Xiaopu Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 283 days.

(21) Appl. No.: 18/343,489

(22) Filed: Jun. 28, 2023

(65) Prior Publication Data

US 2023/0344128 A1 Oct. 26, 2023

Related U.S. Application Data

(63) Continuation of application No. PCT/CN2021/130957, filed on Nov. 16, 2021.

(30) Foreign Application Priority Data

Dec. 29, 2020 (CN) ......................... 202011607906.1

(51) Int. Cl.
*H01Q 5/335* (2015.01)
*H01Q 1/24* (2006.01)
(Continued)

(52) U.S. Cl.
CPC ............. *H01Q 5/335* (2015.01); *H01Q 1/243* (2013.01); *H01Q 5/10* (2015.01); *H01Q 5/20* (2015.01);
(Continued)

(58) Field of Classification Search
CPC .......... H01Q 5/335; H01Q 1/243; H01Q 5/35; H01Q 5/378; H01Q 9/42; H01Q 5/10;
(Continued)

(56) References Cited

U.S. PATENT DOCUMENTS

2009/0201209 A1* 8/2009 Boyle .................. H01Q 9/0421 343/702
2014/0091981 A1 4/2014 Komulainen et al.
(Continued)

FOREIGN PATENT DOCUMENTS

CN 108321495 7/2018
CN 108346863 7/2018
(Continued)

OTHER PUBLICATIONS

CNIPA, First Office Action for CN Application No. 202011607906.1, Apr. 6, 2022.
(Continued)

*Primary Examiner* — Dameon E Levi
*Assistant Examiner* — Yonchan J Kim
(74) *Attorney, Agent, or Firm* — Hodgson Russ LLP

(57) ABSTRACT

An antenna assembly includes a first antenna and a second antenna. The first antenna includes a first radiator, a first signal-source, a first matching circuit, and a first adjusting circuit. The first signal-source is electrically connected to the first matching circuit to the first radiator, and the first adjusting circuit is configured to adjust a resonant frequency-point of the first antenna to make the first antenna support an electromagnetic wave signal in a first frequency band. The second antenna includes a second radiator, a second signal-source, a second matching circuit, and a second adjusting circuit. The second signal-source is electrically connected to the second matching circuit to the second radiator, the second adjustment circuit is configured to adjust a resonant frequency-point of the second antenna to make the second antenna support an electromagnetic wave signal in a second frequency band and a third frequency band.

20 Claims, 16 Drawing Sheets

(51) Int. Cl.

| | |
|---|---|
| ***H01Q 5/10*** | (2015.01) |
| ***H01Q 5/20*** | (2015.01) |
| ***H01Q 5/314*** | (2015.01) |
| ***H01Q 5/321*** | (2015.01) |
| ***H01Q 5/35*** | (2015.01) |
| ***H01Q 5/50*** | (2015.01) |
| ***H01Q 9/42*** | (2006.01) |

(52) U.S. Cl.
CPC ............ *H01Q 5/314* (2015.01); *H01Q 5/321* (2015.01); *H01Q 5/35* (2015.01); *H01Q 5/50* (2015.01); *H01Q 9/42* (2013.01)

(58) Field of Classification Search
CPC .. H01Q 1/36; H01Q 1/48; H01Q 1/50; H01Q 5/20; H01Q 5/314; H01Q 5/321; H01Q 5/50; H01Q 21/0006; H01Q 21/30
See application file for complete search history.

(56) References Cited

U.S. PATENT DOCUMENTS

2016/0351997 A1* 12/2016 Wu ........................ H01Q 5/328
2019/0044218 A1 2/2019 Ye et al.
2019/0131694 A1 5/2019 Lee et al.
2019/0386617 A1* 12/2019 Naraine ................ H03F 1/0288
2021/0126349 A1 4/2021 Zhou et al.
2021/0305703 A1* 9/2021 Li ........................ H01Q 9/0442

FOREIGN PATENT DOCUMENTS

CN 108346863 A * 7/2018 ............ H01Q 1/242
CN 108631041 10/2018
CN 109546311 3/2019
CN 109546311 A * 3/2019 ............... H01Q 1/22
CN 109687111 4/2019
CN 110247160 9/2019
CN 111509368 8/2020
CN 112086753 12/2020
JP 2002158529 5/2002
WO 2020010923 1/2020
WO 2020119366 6/2020

OTHER PUBLICATIONS

CNIPA, Second Office Action for CN Application No. 202011607906.1, Jul. 5, 2022.
WIPO, International Search Report and Written Opinion for International Application No. PCT/CN2021/130957, Jan. 19, 2022.
EPO, Extended European Search Report for EP Application No. 21913544.9, May 23, 2024.

* cited by examiner

ANTENNA ASSEMBLY AND ELECTRONIC DEVICE

CROSS-REFERENCE TO RELATED APPLICATIONS

This application is a continuation of International Application No. PCT/CN2021/130957, filed Nov. 16, 2021, which claims priority to Chinese Patent Application No. 202011607906.1, filed Dec. 29, 2020, the entire disclosures of which are hereby incorporated by reference.

TECHNICAL FIELD

This disclosure relates to the field of communication technology, and in particular, to an antenna assembly and an electronic device.

BACKGROUND

With the development of technologies, electronic devices with communication functions, such as mobile phones, are becoming increasingly popular and increasingly powerful. The electronic device generally includes an antenna assembly to implement a communication function of the electronic device. However, in the related art, communication performance of the antenna assembly in the electronic device is not good enough, and needs to be improved.

SUMMARY

An antenna assembly includes a first antenna and a second antenna. The first antenna includes a first radiator, a first signal-source, a first matching circuit, and a first adjusting circuit. The first signal-source is electrically connected to the first radiator through the first matching circuit, and the first adjusting circuit is electrically connected to the first matching circuit or the first radiator, and configured to adjust a resonant frequency-point of the first antenna to make the first antenna support transmission/reception of an electromagnetic wave signal in a first frequency band. The second antenna includes a second radiator, a second signal-source, a second matching circuit, and a second adjusting circuit. The second signal-source is electrically connected to the second radiator through the second matching circuit, and the second adjusting circuit is electrically connected to the second matching circuit or the second radiator, and configured to adjust a resonant frequency-point of the second antenna to make the second antenna support transmission/reception of an electromagnetic wave signal in a second frequency band and a third frequency band. The antenna assembly has a first resonant mode, a second resonant mode, a third resonant mode, and a fourth resonant mode. The first resonant mode is a ⅛ wavelength mode of the second antenna, the second resonant mode is a ¼ wavelength mode from the first adjusting circuit to a gap between the first radiator and the second radiator, the third resonant mode is a ¼ wavelength mode of the second antenna, and the fourth resonant mode is a ¼ wavelength mode from the second signal-source to the gap between the second radiator and the first radiator. A wavelength of each resonant mode corresponds to a center frequency of said each resonant mode. Transmission/reception of the electromagnetic wave signal in the second frequency band and the third frequency band is supported by the first resonant mode, the second resonant mode, the third resonant mode, and the fourth resonant mode.

According to a second aspect, an electronic device is provided in implementations of the present disclosure. The electronic device includes an antenna assembly. The antenna assembly includes a first antenna and a second antenna. The first antenna includes a first radiator, a first signal-source, a first matching circuit, and a first adjusting circuit. The first signal-source is electrically connected to the first radiator through the first matching circuit, and the first adjusting circuit is electrically connected to the first matching circuit or the first radiator, and configured to adjust a resonant frequency-point of the first antenna to make the first antenna support transmission/reception of an electromagnetic wave signal in a first frequency band. The second antenna includes a second radiator, a second signal-source, a second matching circuit, and a second adjusting circuit. The second signal-source is electrically connected to the second radiator through the second matching circuit, and the second adjusting circuit is electrically connected to the second matching circuit or the second radiator, and configured to adjust a resonant frequency-point of the second antenna to make the second antenna support transmission/reception of an electromagnetic wave signal in a second frequency band and a third frequency band. The antenna assembly has a first resonant mode, a second resonant mode, a third resonant mode, and a fourth resonant mode. The first resonant mode is a ⅛ wavelength mode of the second antenna, the second resonant mode is a ¼ wavelength mode from the first adjusting circuit to a gap between the first radiator and the second radiator, the third resonant mode is a ¼ wavelength mode of the second antenna, and the fourth resonant mode is a ¼ wavelength mode from the second signal-source to the gap between the second radiator and the first radiator. A wavelength of each resonant mode corresponds to a center frequency of said each resonant mode. Transmission/reception of the electromagnetic wave signal in the second frequency band and the third frequency band is supported by the first resonant mode, the second resonant mode, the third resonant mode, and the fourth resonant mode.

Other features and aspects of the disclosed features will become apparent from the following detailed description, taken in conjunction with the accompanying drawings, which illustrate, by way of example, the features in accordance with implementations of the disclosure. The summary is not intended to limit the scope of any implementations described herein.

BRIEF DESCRIPTION OF THE DRAWINGS

To describe technical solutions in implementations of the present disclosure more clearly, the following will give a brief introduction to accompanying drawings required for describing implementations or the related art. Apparently, the accompanying drawings described hereinafter are merely some implementations of the disclosure. Based on these drawings, those of ordinary skill in the art can also obtain other drawings without creative effort.

DETAILED DESCRIPTION

Figure 1:
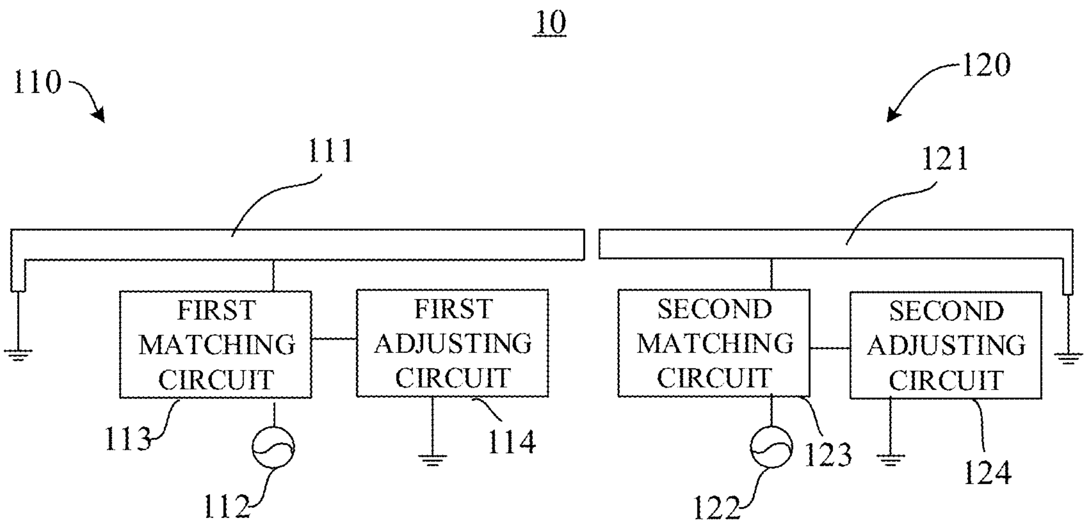
FIG. 1 is a schematic diagram of an antenna assembly provided in an implementation of the present disclosure.

In a first aspect, an antenna assembly is provided in the present disclosure. The antenna assembly includes a first antenna and a second antenna.

The first antenna includes a first radiator, a first signal-source, a first matching circuit, and a first adjusting circuit, where the first signal-source is electrically connected to the first radiator through the first matching circuit, and the first adjusting circuit is electrically connected to the first matching circuit or the first radiator, and configured to adjust a resonant frequency-point of the first antenna to make the first antenna support transmission/reception of an electromagnetic wave signal in a first frequency band. The second antenna includes a second radiator, a second signal-source, a second matching circuit, and a second adjusting circuit, where the second signal-source is electrically connected to the second radiator through the second matching circuit, and the second adjusting circuit is electrically connected to the second matching circuit or the second radiator, and configured to adjust a resonant frequency-point of the second antenna to make the second antenna support transmission/reception of an electromagnetic wave signal in a second frequency band and a third frequency band. The antenna assembly has a first resonant mode, a second resonant mode, a third resonant mode, and a fourth resonant mode. The first resonant mode is a ⅛ wavelength mode of the second antenna, the second resonant mode is a ¼ wavelength mode from the first adjusting circuit to a gap between the first radiator and the second radiator, the third resonant mode is a ¼ wavelength mode of the second antenna, and the fourth resonant mode is a ¼ wavelength mode from the second signal-source to the gap between the second radiator and the first radiator. Transmission/reception of the electromagnetic wave signal in the second frequency band and the third frequency band is supported by the first resonant mode, the second resonant mode, the third resonant mode, and the fourth resonant mode.

In an implementation, the first radiator serves as a parasitic branch of the second antenna, the second radiator serves as a parasitic branch of the first antenna, transmission/reception of the electromagnetic wave signal in the first frequency band is supported by the first antenna by using the first radiator and the second radiator, and transmission/reception of the electromagnetic wave signal in the second frequency band and the third frequency band is supported by second antenna by using the first radiator and the second radiator.

In an implementation, the first adjusting circuit is configured to implement low-impedance to ground of the electromagnetic wave signal in the second frequency band and in the third frequency band.

In an implementation, the first frequency band includes a lower band (LB), the second frequency band includes a middle high band (MHB), and the third frequency band includes an ultra-high band (UHB).

In an implementation, the first adjusting circuit is further configured to switch among frequency bands supported by the first antenna in the first frequency band.

In an implementation, the first adjusting circuit includes multiple adjusting sub-circuits and a switch unit, and the switch unit is configured to electrically connect, under control of a control signal, at least one adjusting sub-circuit in the multiple adjusting sub-circuits to the first matching circuit or the first radiator.

In an implementation, an adjusting sub-circuit includes any one or any combination of a capacitor, an inductor, or a resistor.

In an implementation, ⅛ of a wavelength corresponding to a center frequency of the first resonant mode is the length of the second antenna, ¼ of a wavelength corresponding to a center frequency of the second resonant mode is a distance from the first adjusting circuit to a gap between the first radiator and the second radiator, ¼ of a wavelength corresponding to a center frequency of the third resonant mode is the length of the second antenna, and ¼ of a wavelength corresponding to a center frequency of the fourth resonant mode is a distance from the second signal-source to the gap between the second radiator and the first radiator In an implementation, the first adjusting circuit includes a first inductor, a second inductor, a third inductor, and a capacitor, where the first inductor, the second inductor, and the third inductor are different in inductance, the switch unit includes a common terminal, a first switch sub-unit, a second switch sub-unit, a third switch sub-unit, and a fourth switch sub-unit, and the common terminal is electrically connected to the first matching circuit; the first sub-switch unit has one end electrically connected to the first inductor, and the other end electrically connected to the common terminal; the second sub-switch unit has one end electrically connected to the second inductor, and the other end electrically connected to the common terminal; the third switch sub-unit has one end electrically connected to the third inductor, and the other end electrically connected to the common terminal; and the fourth switch sub-unit has one end electrically connected to the capacitor, and the other end electrically connected to the common terminal.

In an implementation, the first matching circuit includes a first matching inductor, a first matching capacitor, a second matching inductor, a second matching capacitor, a third matching capacitor, and a third matching inductor, the first matching inductor has one end electrically connected to the first signal-source, and the other end electrically connected to the first radiator through the first matching capacitor and the second matching inductor in sequence, and a connection point between the first matching capacitor and the second matching inductor is electrically connected to the common terminal; the second matching capacitor has one end electrically connected to the connection point between the first matching inductor and the first matching capacitor, and the other end grounded; the third matching capacitor has one end electrically connected to the first radiator, and the other end grounded; and the third matching inductor has one end electrically connected to the first radiator, and the other end grounded.

In an implementation, the third matching capacitor includes a first matching sub-capacitor and a second matching sub-capacitor, the first matching sub-capacitor has one end electrically connected to the first radiator, and the other end grounded.

In an implementation, the second radiator is spaced apart from and coupled with the first radiator.

In an implementation, the first radiator has a first ground end, a first free end, a first feed point, and a first connection point, the first ground end is grounded, the first free end is spaced apart from and coupled with the second radiator, the first feed point and the first connection point are located between the first ground end and the first free end, the first signal-source is electrically connected to the first feed point of the first radiator through the first matching circuit, the first adjusting circuit is electrically connected to the first radiator, and the first adjusting circuit is electrically connected to the first connection point of the first radiator, The first connection point is located between the first ground end and the first feed point, or the first connection point is located between the first feed point and the first free end.

In an implementation, the second radiator has a second ground end, a second free end, a second feed point, and a second connection point, the second ground end is grounded, the second free end is spaced apart from and coupled with the first radiator, the second feed point and the second connection point are located between the second ground end and the second free end, the second signal-source is electrically connected to the second feed point of the second radiator through the second matching circuit, the second adjusting circuit is electrically connected to the second radiator, and the second adjusting circuit is electrically connected to the second connection point of the second radiator. The second connection point is located between the second ground end and the second feed point, or the second connection point is located between the second feed point and the second free end.

In an implementation, the first matching circuit includes one or more frequency-selective sub-circuits, the second matching circuit includes one or more frequency-selective filter sub-circuits, and the frequency-selective filter sub-circuits are further configured to isolate the first antenna from the second antenna.

In an implementation, the frequency-selective filter sub-circuit includes one or more of the following: a band-pass circuit formed by an inductor and a capacitor connected in series; a band-stop circuit formed by an inductor and a capacitor connected in parallel; an inductor, a first capacitor, and a second capacitor, where the inductor is connected in parallel with the first capacitor, and the second capacitor is electrically connected to a node where the inductor is electrically connected to the first capacitor; a capacitor, a first inductor, and a second inductor, where the capacitor is connected in parallel with the first inductor, and the second inductor is electrically connected to a node where the capacitor is electrically connected to the first inductor; an inductor, a first capacitor, and a second capacitor, where the inductor is connected in series with the first capacitor, the second capacitor has one end electrically connected to an end of the inductor that is not connected to the first capacitor, and the other end electrically connected to one end of the first capacitor that is not connected to the inductor; a capacitor, a first inductor, and a second inductor, where the capacitor is connected in series with the first inductor, the second inductor has one end electrically connected to one end of the capacitor that is not connected to the first inductor, and the other end electrically connected to one end of the first inductor that is not connected to the capacitor; a first capacitor, a second capacitor, a first inductor, and a second inductor, where the first capacitor is connected in parallel with the first inductor, the second capacitor is connected in parallel with the second inductor, and one end of an entirety formed by the second capacitor and the second inductor connected in parallel is electrically connected to one end of an entirety formed by the first capacitor and the first inductor connected in parallel; or a first capacitor, a second capacitor, a first inductor, and a second inductor, where the first capacitor and the first inductor are connected in series to form a first unit, the second capacitor and the second inductor are connected in series to form a second unit, and the first unit and the second unit are connected in parallel.

In an implementation, long term evolution (LTE) new radio (NR) double connect (ENDC) and carrier aggregation (CA) in a frequency-band range of 1000 MHz~6000 MHz is implemented by the first antenna and the second antenna.

In an implementation, a dimension d of a gap between the first radiator and the second radiator satisfies: 0.5 mm≥d≥1.5 mm.

In a second aspect, an electronic device is provided in the present disclosure. The electronic device includes the antenna assembly in the first aspect.

In an implementation, the electronic device includes a middle frame, the middle frame includes a frame body and an edge frame, the edge frame is bendably connected with a periphery of the frame body; and one of the first radiator of the first antenna and the second radiator of the second antenna in the antenna assembly is formed on the edge frame.

In an implementation, the electronic device includes a top portion and a bottom portion, and the first radiator and the second radiator are both disposed on the top portion.

The following clearly and completely describes technical solutions in implementations of the present disclosure with reference to the accompanying drawings in the implementations of the present disclosure. Apparently, described implementations are merely some rather than all of implementations of the present disclosure. All other implementations obtained by those of ordinary skill in the art based on the implementations of the present disclosure without creative efforts shall belong to the scope of protection of the present disclosure.

Reference herein to "an implementation" or "implementations" means that a particular feature, structure, or characteristic described in conjunction with an implementation or implementations can be included in at least one implementation of the present disclosure. The appearances of this term in various places in the description are not necessarily all referring to the same implementation, nor are separate or alternative implementations mutually exclusive of other implementations. It is apparent and implicitly understood by those of ordinary skill in the art that implementations described herein can be combined with other implementations.

An antenna assembly 10 is provided in the present disclosure. The antenna assembly 10 can be applied to an electronic device 1, and the electronic device 1 includes, but is not limited to, an electronic device 1 having a communication function, such as a mobile phone, an Internet device (MID), an electronic book, a play station portable (PSP), or a personal digital assistant (PDA).

Reference is made to FIG. 1, which is a schematic diagram of an antenna assembly provided in an implementation of the present disclosure. The antenna assembly 10 includes a first antenna 110 and a second antenna 120. The first antenna 110 includes a first radiator 111, a first signal-source 112, a first matching circuit 113, and a first adjusting circuit 114. The first signal-source 112 is electrically connected to the first radiator 111 through the first matching circuit 113. The first adjusting circuit 114 is electrically connected to the first matching circuit 113 or the first radiator 111, and is configured to adjust a resonant frequency-point of the first antenna 110, so that transmission/reception of an electromagnetic wave signal in a first frequency band is supported by the first antenna 110. The second antenna 120 includes a second radiator 121, a second signal-source 122, a second matching circuit 123, and a second adjusting circuit 124. The second signal-source 122 is electrically connected to the second radiator 121 through the second matching circuit 123. The second adjusting circuit 124 is electrically connected to the second matching circuit 123 or the second radiator 121. The second adjusting circuit 124 is configured to adjust a resonant frequency-point of the second antenna 120, so that transmission/reception of an electromagnetic wave signal in a second frequency band and a third frequency band is supported by the second antenna 120. The antenna assembly 10 has a first resonant mode, a second resonant mode, a third resonant mode, and a fourth resonant mode. The first resonant mode is a ⅛ wavelength mode of the second antenna 120, the second resonant mode is a ¼ wavelength mode from the first adjusting circuit 114 to a gap between the first radiator 111 and the second radiator 121, the third resonant mode is a ¼ wavelength mode of the second antenna 120, and the fourth resonant mode is a ¼ wavelength mode from the second signal-source 122 to the gap between the second radiator 121 and the first radiator 111. Transmission/reception of the electromagnetic wave signal in the second frequency band and the third frequency band is supported by the first resonant mode, the second resonant mode, the third resonant mode, and the fourth resonant mode. A wavelength of each resonant mode corresponds to a center frequency of said each resonant mode. In other words, ⅛ of a wavelength corresponding to a center frequency of the first resonant mode is the length of the second antenna 120, ¼ of a wavelength corresponding to a center frequency of the second resonant mode is a distance from the first adjusting circuit 114 to a gap between the first radiator 111 and the second radiator 121, ¼ of a wavelength corresponding to a center frequency of the third resonant mode is the length of the second antenna 120, and ¼ of a wavelength corresponding to a center frequency of the fourth resonant mode is a distance from the second signal-source 122 to the gap between the second radiator 121 and the first radiator 111.

The first adjusting circuit 114 is electrically connected to the first matching circuit 113 or the first radiator 111, the second adjusting circuit 124 is electrically connected to the second matching circuit 123 or the second radiator 121, and these cases may be randomly combined as follows. In some implementations, the first adjusting circuit 114 is electrically connected to the first matching circuit 113 and the second adjusting circuit 124 is electrically connected to the second matching circuit 123; or, the first adjusting circuit 114 is electrically connected to the first matching circuit 113 and the second adjusting circuit 124 is electrically connected to the second radiator 121; or, the first adjusting circuit 114 is electrically connected to the first radiator 111 and the second adjusting circuit 124 is electrically connected to the second matching circuit 123; or, the first adjusting circuit 114 is electrically connected to the first radiator 111 and the second adjusting circuit 124 is electrically connected to the second radiator 121. In an implementation as illustrated in FIG. 1, for example, the first adjusting circuit 114 is electrically connected to the first matching circuit 113 and the second adjusting circuit 124 is electrically connected to the second matching circuit 123.

Figure 2:
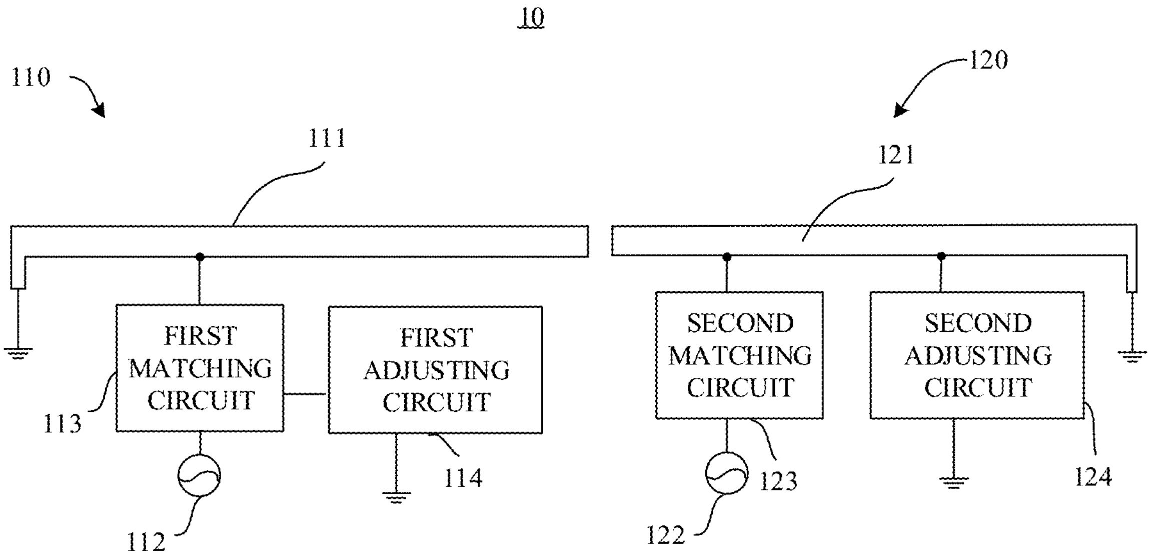
FIG. 2 to FIG. 4 are schematic diagrams of antenna assemblies provided in other implementations of the present disclosure.
Figure 3:
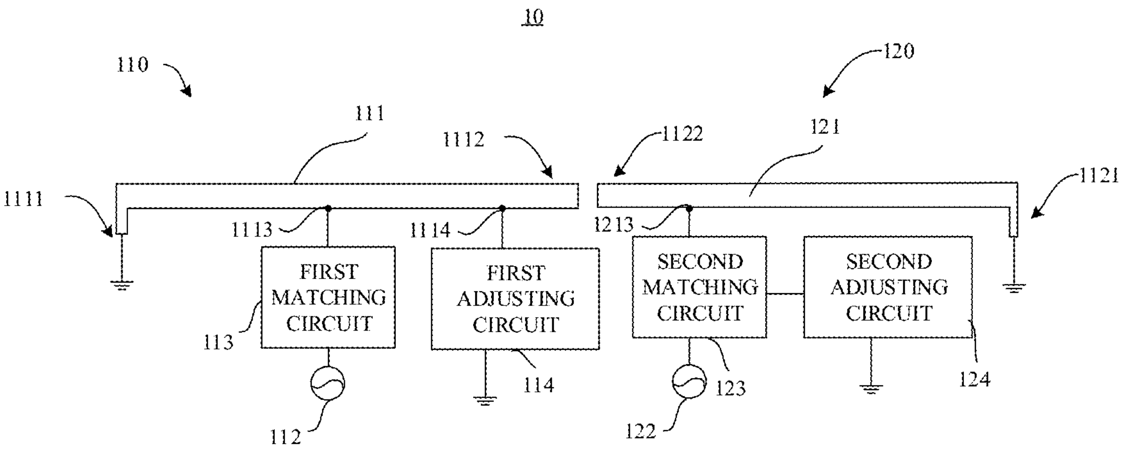
Figure 4:
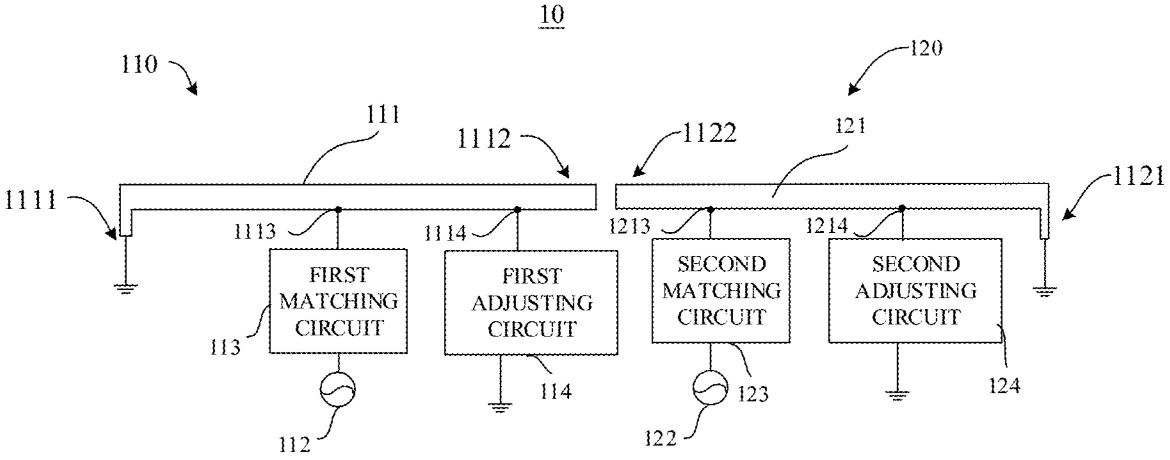

Reference of other forms of the antenna assembly is made to FIG. 2 to FIG. 4. FIG. 2 to FIG. 4 are schematic diagrams of antenna assemblies provided in other implementations of the present disclosure. In FIG. 2, the first adjusting circuit 114 is electrically connected to the first matching circuit 113, and the second adjusting circuit 124 is electrically connected to the second radiator 121. In FIG. 3, the first adjusting circuit 114 is electrically connected to the first radiator 111, and the second adjusting circuit 124 is electrically connected to the second matching circuit 123. In FIG. 4, the first adjusting circuit 114 is electrically connected to the first radiator 111, and the second adjusting circuit 124 is electrically connected to the second radiator 121.

It should be noted that terms such as "first" and "second" in the specification, claims, and accompany drawings of the present disclosure are used for distinguishing different objects, rather than for describing a specific sequence. In addition, terms "include" and "have", and any variations thereof, are intended to cover a non-exclusive inclusion. The antenna assembly 10 including the first antenna 110 and the second antenna 120 does not exclude that the antenna assembly 10 includes other antennas in addition to the first antenna 110 and the second antenna 120.

A signal source refers to a component that generates an excitation signal. When the first antenna 110 is configured to receive an electromagnetic wave signal, the first signal-source 112 generates a first excitation signal, and the first excitation signal is loaded onto the first radiator 111 (in this implementation, a first feed point 1113) through the first matching circuit 113, so that the first radiator 111 radiates an electromagnetic wave signal. Correspondingly, when the second antenna 120 is configured to receive an electromagnetic wave signal, the second signal-source 122 generates a second excitation signal, and the second excitation signal is loaded onto the second radiator 121 (in this implementation, a second feed point 1213) through the second matching circuit 123, so that the second radiator 121 receives and transmits an electromagnetic wave signal.

The first radiator 111 may be a flexible printed circuit (FPC) antenna radiator, a laser direct structuring (LDS) antenna radiator, or a printed direct structuring (PDS) antenna radiator, or a metal bracket. Correspondingly, the second radiator 121 may be an FPC antenna radiator, an LDS antenna radiator, a PDS antenna radiator, or a metal branch. It can be understood that types of the first radiator 111 and the second radiator 121 may be the same or different.

The first resonant mode corresponding to the ⅛ wavelength mode of the second antenna 120 will be described later with reference to a simulation diagram.

In the antenna assembly 10 provided in the present disclosure, the first resonant mode corresponding to the ⅛ wavelength mode of the second antenna 120 covers part of in the second frequency band and the third frequency band, so that transmission/reception of an electromagnetic wave signal in the first frequency band, the second frequency band, and the third frequency band is supported by the antenna assembly 10. Thus, the antenna assembly 10 has a wide bandwidth and better communication performance In this implementation, the first frequency band includes a lower band (LB), the second frequency band includes a middle high band (MHB), and the third frequency band includes an ultra-high band (UHB).

The LB refers to a frequency band with a frequency lower than 1000 MHz, the MHB ranges from 1000 MHz to 3000 MHz, and the UHB ranges from 3000 MHz to 6000 MHz.

In this implementation, the antenna assembly 10 is operable in the first resonant mode, the second resonant mode, the third resonant mode, and the fourth resonant mode together to support transmission/reception of the electromagnetic wave signal in the second frequency band and the third frequency band.

In an implementation, the second radiator 121 is spaced apart from and coupled with and the first radiator 111. In the antenna assembly 10 provided in this implementation, the second radiator 121 is spaced apart from and coupled with the first radiator 111. The first antenna 110 and the second antenna 120 each is an antenna with a parasitic branch. In other words, the first radiator 111 serves as a parasitic branch of the second antenna 110, and the second radiator 121 serves as a parasitic branch of the first antenna 120. Due to the coupling effect between the first radiator 111 and the second radiator 121, when the first antenna 110 operates, not only the first radiator 111 is configured to receive and transmit an electromagnetic wave signal, but also the second radiator 121 is configured to receive and transmit an electromagnetic wave signal, so that the first antenna 110 can operate in a relatively wide frequency-band. Likewise, when the second antenna 120 operates, not only the second radiator 121 is configured to receive and transmit an electromagnetic wave signal, but also the first radiator 111 is configured to receive and transmit an electromagnetic wave signal, so that the second antenna 120 can operate in a relatively wide frequency-band. In addition, when the first antenna 110 operates, not only the first radiator 111 but also the second radiator 121 can be configured to receive and transmit an electromagnetic wave signal, when the second antenna 120 operates, not only the second radiator 121 but also the first radiator 111 can be configured to receive and transmit an electromagnetic wave signal, therefore, radiators in the antenna assembly 10 are multiplexed, and space is multiplexed, thereby facilitating the reduction of the size of the antenna assembly 10. It can be seen from the above analysis that the antenna assembly 10 has a small size, and when the antenna assembly 10 is applied to the electronic device 1, the antenna assembly 10 is easily stacked with other devices in the electronic device 1.

Figure 5:
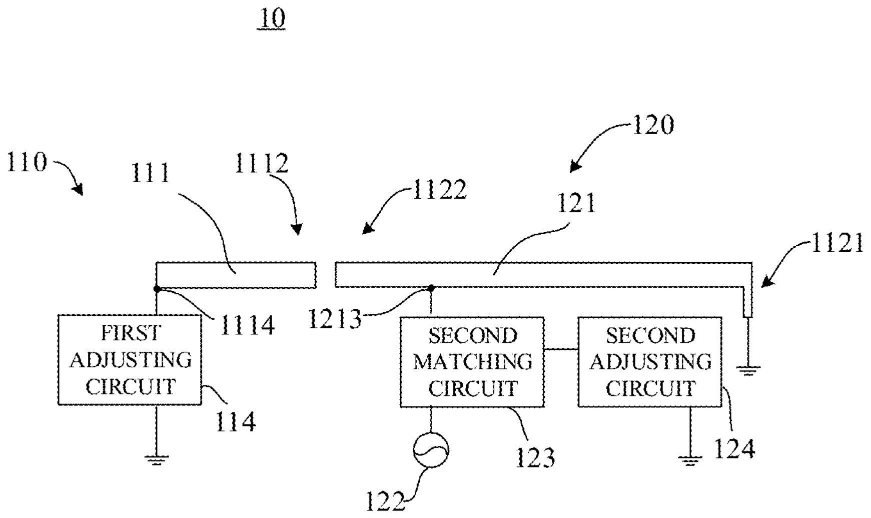
FIG. 5 is an equivalent schematic diagram of the antenna assembly including the first adjusting circuit as illustrated in FIG. 3 implementing low-impedance to ground in a second frequency band and a third frequency band.

Reference is made to FIGS. 3 and 5 together, where FIG. 5 is an equivalent schematic diagram of the antenna assembly including the first adjusting circuit as illustrated in FIG. 3 implementing low-impedance to ground in the second frequency band and the third frequency band. The first adjusting circuit 114 implements low-impedance to ground of an electromagnetic wave signal in the second frequency band and in the third frequency band, and part of the first radiator 111 from a connection point where the first adjusting circuit 114 is connected to the first radiator 111 to a ground end (a first ground end 1111) of the first radiator 111 is equivalent to zero. An equivalent antenna assembly 10 is as illustrated in FIG. 5, which will be described later in combination with the simulation diagram of S-parameters.

Reference is made to FIG. 3 again, in this implementation, the first radiator 111 has a first ground end 1111, a first free end 1112, a first feed point 1113, and a first connection point 1114. The first ground end 1111 is grounded, the first free end 1112 is spaced apart from and coupled with the second radiator 121, the first feed point 1113 is spaced apart from the first connection point 1114, and the first feed point 1113 and the first connection point 1114 are located between the first ground end 1111 and the first free end 1112. In a schematic diagram of this implementation, for example, the first connection point 1114 is located between the first feed point 1113 and the first free end 1112. In other implementations, the first connection point 1114 may also be located between the first feed point 1113 and the first ground end 1111. One end of the first adjusting circuit 114 is grounded, and the other end of the first adjusting circuit 114 is electrically connected to the first connection point 1114. The second radiator 121 further includes a second ground end 1121 and a second free end 1122, the second ground end 1121 is grounded, the second free end 1122 is spaced apart from the first free end 1112, and the second feed point 1213 is located between the second ground end 1121 and the second free end 1122.

Figure 6:
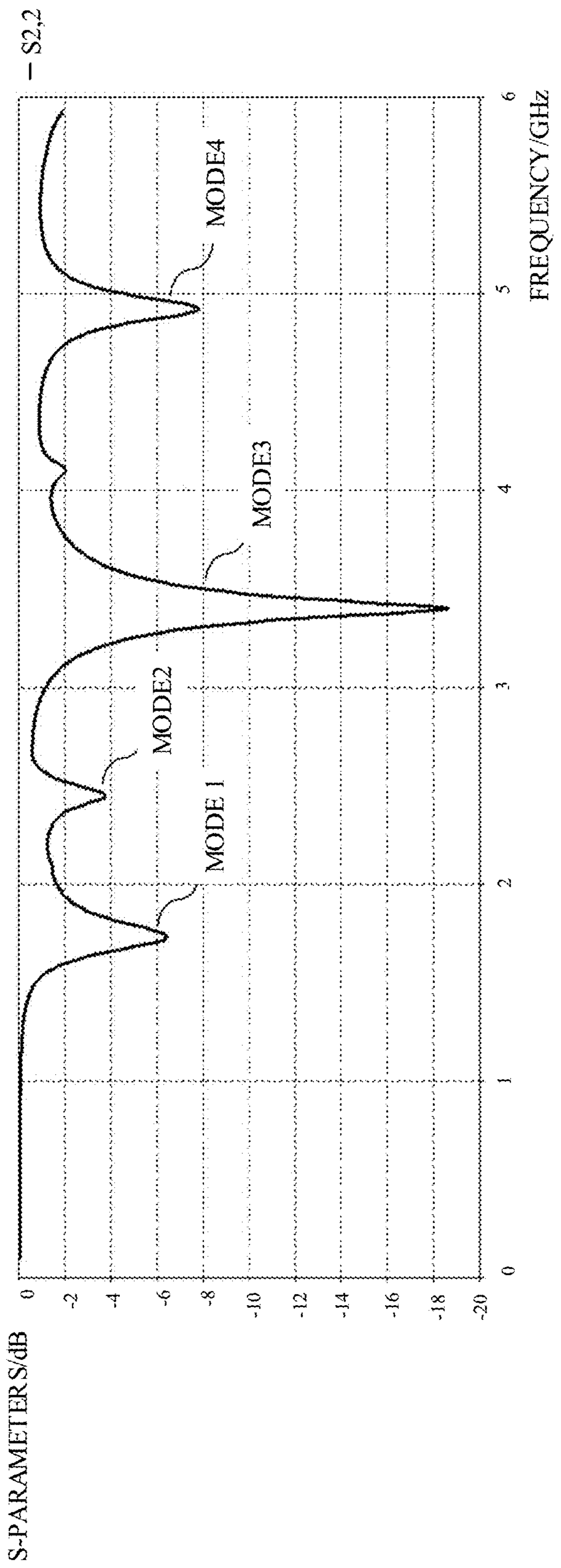
FIG. 6 is simulation diagram of part of S-parameters of the antenna assembly as illustrated in FIG. 3.

The four resonant modes of the antenna assembly 10 will be described below with reference to a simulation diagram. The so-called resonant modes are also called resonant patterns. Reference is made to FIG. 6, which is a simulation diagram of part of S-parameters of the antenna assembly as illustrated in FIG. 3. In the schematic diagram of this implementation, the abscissa represents frequency in unit of GHz, the ordinate represents S-parameters in unit of dB. It can be seen from the simulation diagram that the antenna assembly 10 has a first resonant mode (marked as mode 1 in the figure), a second resonant mode (marked as mode 2 in the figure), a third resonant mode (marked as mode 3 in the figure), and a fourth resonant mode (marked as mode 4 in the figure). The first resonant mode is a ⅛ wavelength mode of the second antenna 120, the second resonant mode is a ¼ wavelength mode from the first adjustment circuit 114 to a gap between the first radiator 111 and the second radiator 121, the third resonant mode is a ¼ wavelength mode of the second antenna 120, and the fourth resonant mode is a ¼ wavelength mode from the second signal-source 122 to the gap between the second radiator 121 and the first radiator 111.

A sequence of appearance of each resonant mode changes according to a change of the length of the first radiator 111 and a change of the length of the second radiator 121. The second resonant mode, the third resonant mode, and the fourth resonant mode herein are ¼ wavelength modes, that is, basic modes. When the second resonant mode is a fundamental mode, the first resonant mode has a higher transmit/receive power; likewise, when the third resonant mode is a fundamental mode, the third resonant mode has a higher transmit/receive power; and likewise, when the fourth resonant mode is a fundamental mode, the fourth resonant mode has high transmit/receive power. It should be noted that, the second resonant mode, the third resonant mode, and the fourth resonant mode may be higher-order modes, and although the transmit/receive power of a higher-order mode is smaller than the transmit/receive power of the fundamental mode, as long as the first resonant mode, the second resonant mode, the third resonant mode, and the fourth resonant mode together implement transmission/reception of the electromagnetic wave signal in the second frequency band and the third frequency band.

It can be seen from the simulation diagram of this implementation that, in the antenna assembly 10, the first resonant mode, the second resonant mode, the third resonant mode, and the fourth resonant mode may cover transmission/reception of an electromagnetic wave signal in MHB and UHB. That is, transmission/reception of an electromagnetic wave signal in a frequency-band range of 1000 MHz~6000 MHz are achieved.

Figure 7:
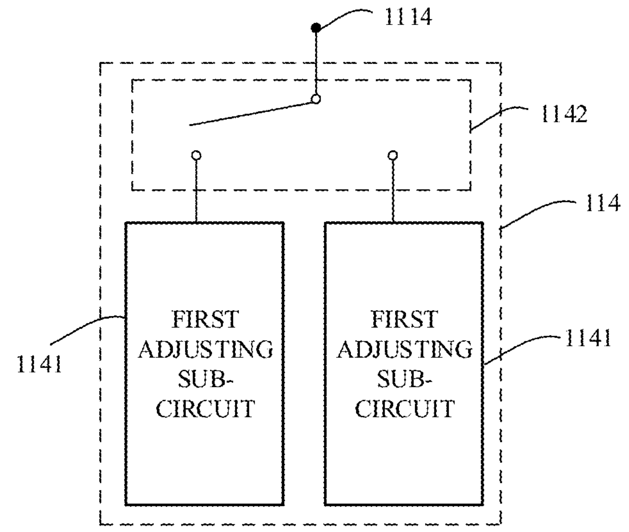
FIG. 7 is a schematic diagram of a first adjusting circuit provided in an implementation of the present disclosure.

Reference is made to FIG. 7, which is a schematic diagram of a first adjusting circuit provided in an implementation of the present disclosure. In the schematic diagram of this implementation, the first adjusting circuit 114 includes multiple adjusting sub-circuits and a switch unit. Under control of a control signal, the switch unit is configured to electrically connect at least one adjusting sub-circuit in the multiple adjusting sub-circuits to the first matching circuit 113 or the first radiator 111. For convenience of description, the adjusting sub-circuits included in the first adjusting circuit 114 are named as first adjusting sub-circuits 1141, and the switch unit in the first adjusting circuit 114 is named as the first switch unit 1142. For example, the first switch unit 1142 is electrically connected to the first connection point 1114, the first switch unit 1142 is further electrically connected to the multiple first sub-adjustment circuits 1141 to be grounded, and under the control of the control signal, the first switch unit 1142 is configured to electrically connect at least one first sub-adjustment circuit 1141 in the multiple first sub-adjustment circuits 1141 to the first connection point 1114.

In the schematic diagram of this implementation, for example, the first adjusting sub-circuit 1141 includes two first adjusting sub-circuits 1141, and accordingly, the first switch unit 1142 is a single-pole double-throw (SPDT) switch. A movable terminal of the first switch unit 1142 is electrically connected to the first connection point 1114, one fixed terminal of the first switch unit 1142 is electrically connected to one of the first adjusting sub-circuits 1141 to be grounded, and the other fixed terminal of the first switch unit 1142 is electrically connected to the other one of the first adjusting sub-circuits 1141 to be grounded. It can be understood that, in other implementations, the first adjusting circuit 114 includes N first adjusting sub-circuits 1141. Accordingly, the first switch unit 1142 is a single-pole N-throw (SPNT) switch, or the first switch unit 1142 is an N-pole N-throw (NPNT) switch, where N≥2, and N is a positive integer.

Figure 8:
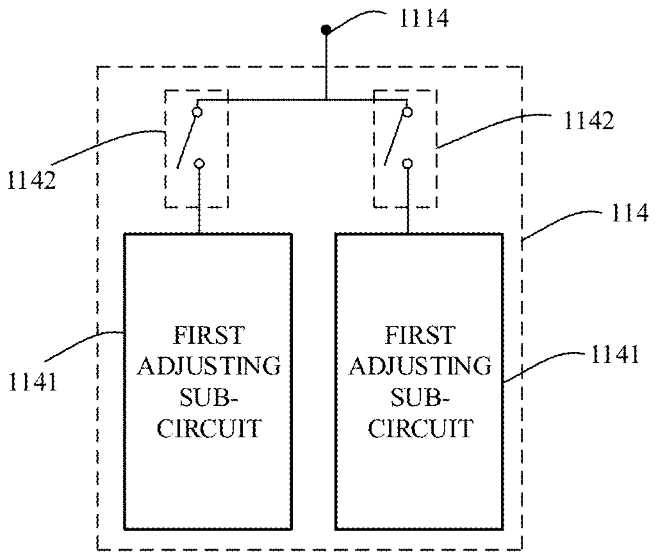
FIG. 8 is a schematic diagram of a first adjusting circuit provided in another implementation of the present disclosure.

Reference is made to FIG. 8, which is a schematic diagram of a first adjusting circuit provided another implementation of the present disclosure. In the implementation, the first adjusting circuit 114 includes M first adjusting sub-circuits 1141 and M first switch units 1142, and each of the first switch units 1142 is connected in series with one of the first adjusting sub-circuits 1141, where M≥2, and M is a positive integer. In the schematic diagram of this implementation, for illustrative purpose, M=2.

It can be understood that, forms of the first adjusting sub-circuit 1141 and the first switch unit 1142 in the first adjusting circuit 114 are not limited to those described above, as long as the first switch unit 1142 is capable of electrically connect at least one first adjusting sub-circuit 1141 in the multiple first adjusting sub-circuits 1141 to the first connection point 1114 under the control of the control signal.

The first adjusting sub-circuit 1141 includes any one or any combination of a capacitor, an inductor, or a resistor. Therefore, the first adjusting sub-circuit 1141 is also referred to as a lumped circuit.

Figure 9:
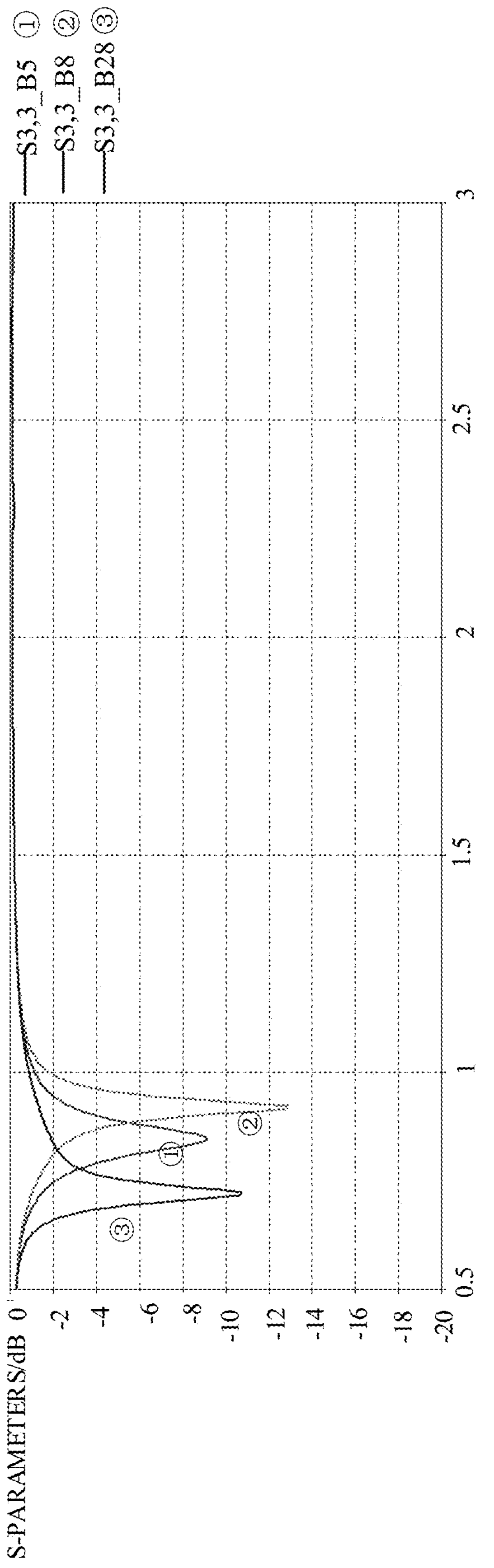
FIG. 9 is a simulation diagram of a first adjusting circuit switching among frequency bands supported by a first antenna in a first frequency band.

Reference is made to FIG. 9, which is a simulation diagram of a first adjusting circuit switching among frequency bands supported by the first antenna in the first frequency band. In the simulation diagram, the abscissa represents frequency in units of GHz, and the ordinate represents S-parameters in units of dB. In this simulation diagram, curve 1 is band 5 (B5), curve 2 is Band 8 (B8), and curve 3 is Band 28 (B28). The first adjusting circuit 114 is further configured to switch among frequency bands supported by the first antenna 110 in the first frequency band. The frequency bands supported in the first frequency band include, but are not limited to, B28, B5, and B8. The first adjusting circuit 114 is configured to enable the first antenna 110 to work in any one of B28, band 20 (B20), B5, or B8 and to be switchable among B28, B5 and B8. In other implementations, frequency bands supported in the first frequency band include, but are not limited to, B28, B20, B5, and B8.

Figure 10:
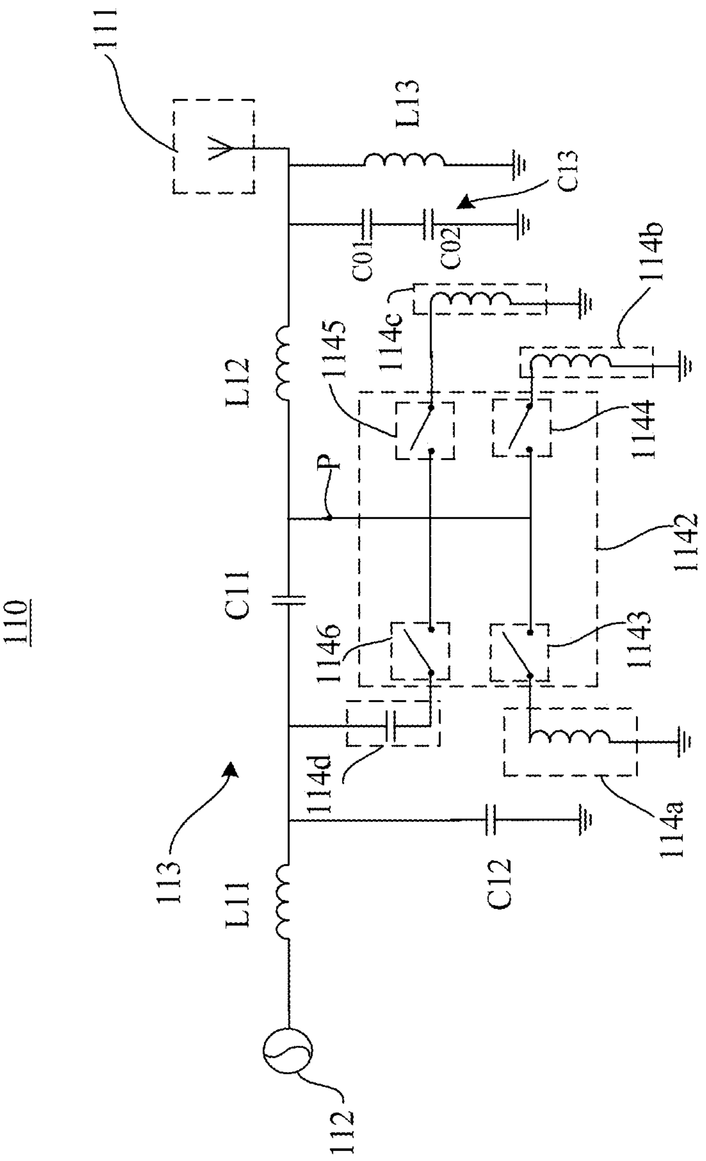
FIG. 10 is an equivalent circuit diagram of a first antenna in the antenna assembly in FIG. 1.

Reference is made to FIG. 10, which is an equivalent circuit diagram of the first antenna in the antenna assembly in FIG. 1. In this implementation, the first adjusting circuit 114 includes four first adjusting sub-circuits. The first adjusting circuit 114 includes a first inductor 114*a*, a second inductor 114*b*, a third inductor 114*c*, and a capacitor 114*d*. The first inductor 114*a*, the second inductor 114*b*, and the third inductor 114*c* have different inductance. The first switch unit 1142 includes a common terminal P, a first switch sub-unit 1143, a second switch sub-unit 1144, a third switch sub-unit 1145, and a fourth switch sub-unit 1146. The common terminal P is electrically connected to the first matching circuit 113, one end of the first sub-switch unit 1143 is electrically connected to the first inductor 114*a*, and the other end of the first sub-switch unit 1143 is electrically connected to the common terminal P. One end of the second switch sub-unit 1144 is electrically connected to the second inductor 114*b*, and the other end of the second switch sub-unit 1144 is electrically connected to the common terminal P. One end of the third switch sub-unit 1145 is electrically connected to the third inductor 114*c*, and the other end of the third switch sub-unit 1145 is electrically connected to the common terminal P. One end of the fourth switch sub-unit 1146 is electrically connected to the capacitor 114*d*, and the other end of the fourth switch sub-unit 1146 is electrically connected to the common terminal P.

Correspondingly, the first matching circuit 113 includes a first matching inductor L11, a first matching capacitor C11, a second matching inductor L12, a second matching capacitor C12, a third matching capacitor C13, and a third matching inductor L13. One end of the first matching inductor L11 is electrically connected to the first signal-source 112, the other end of the first matching inductor L11 is electrically connected to the first radiator 111 through the first matching capacitor C11 and the second matching inductor L12 in sequence, and a connection point between the first matching capacitor C11 and the second matching inductor L12 is electrically connected to the common terminal P. One end of the second matching capacitor C12 is electrically connected to a connection point between the first matching inductor L11 and the first matching capacitor C11, and the other end of the second matching capacitor C12 is grounded. One end of the third matching capacitor C13 is electrically connected to the first radiator 111, and the other end the third matching capacitor C13 is grounded. One end of the third matching inductor L13 is electrically connected to the first radiator 111, and the other end of the third matching inductor L13 is grounded.

In this implementation, the third matching capacitor C13 includes a first matching sub-capacitor C01 and a second matching sub-capacitor C02, one end of the first matching sub-capacitor C01 is electrically connected to the first radiator 111, and the other end of the first matching sub-capacitor C01 is electrically connected to second matching sub-capacitor C02 to be grounded.

It should be noted that a matching capacitor is also a capacitor, and a matching inductor is also an inductor. In other words, the third matching capacitor C13 includes two capacitors (the first matching sub-capacitor C01 and the second matching sub-capacitor C02) connected in series. The third matching capacitor C13 includes two capacitors connected in series, which can facilitate selecting an appropriate capacitor to achieve a capacitance.

The first matching circuit 113 includes one or more frequency-selective filter sub-circuits 113*a*, and the second matching circuit 123 includes one or more frequency-selective filter sub-circuits 113*a*. The frequency-selective filter sub-circuits 113*a* are further configured to isolate the first antenna 110 from the second antenna 120. Reference is made to FIGS. 11 to 18 together, where FIGS. 11 to 18 are schematic diagrams of frequency-selective filter sub-circuits provided in various implementations, respectively. The frequency-selective filter sub-circuit 113*a* includes one or more of the following circuits.

Figure 11:
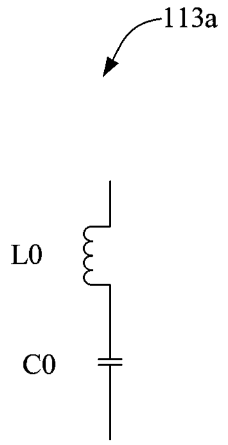
FIGS. 11 to 18 are schematic diagrams of frequency-selective filter sub-circuits provided in various implementations.

Reference is made to FIG. 11, and in FIG. 11, the frequency-selective filter sub-circuit 113*a* includes a band-pass circuit formed by an inductor L0 and a capacitor C0 connected in series.

Figure 12:
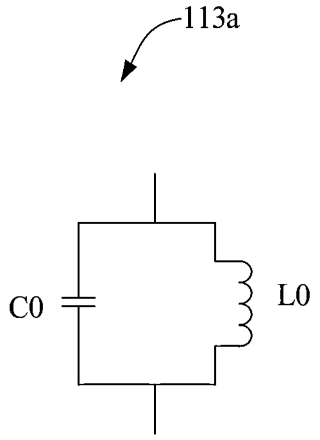

Reference is made to FIG. 12, and in FIG. 12, the frequency-selective filter sub-circuit 113*a* includes a band-stop circuit formed by an inductor L0 and a capacitor C0 connected in parallel.

Figure 13:
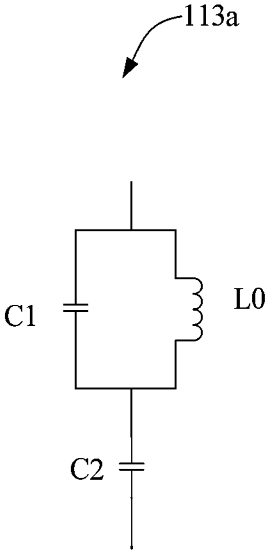

Reference is made to FIG. 13, and in FIG. 13, the frequency-selective filter sub-circuit 113*a* includes an inductor L0, a first capacitor C1, and a second capacitor C2. The inductor L0 is connected in parallel with the first capacitor C1, and the second capacitor C2 is electrically connected to a node where the inductor L0 is electrically connected to the first capacitor C1.

Figure 14:
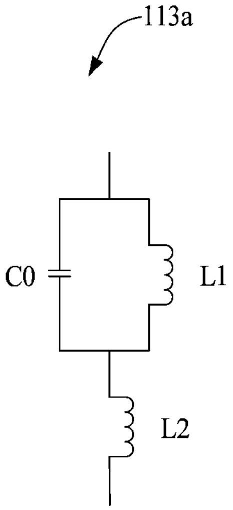

Reference is made to FIG. 14, and in FIG. 14, the frequency-selective filter sub-circuit 113*a* includes a capacitor C0, a first inductor L1, and a second inductor L2. The capacitor C0 is connected in parallel with the first inductor L1, and the second inductor L2 is electrically connected to a node where the capacitor C0 is electrically connected to the first inductor L1.

Figure 15:
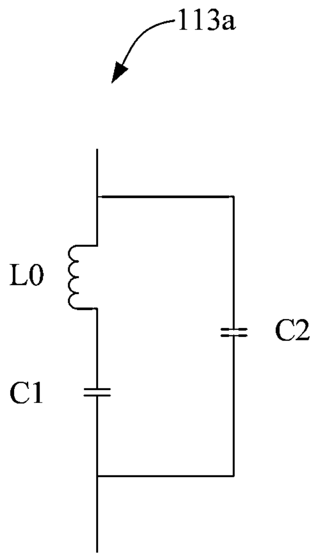

Reference is made to FIG. 15, and in FIG. 15, the frequency-selective filter sub-circuit 113*a* includes an inductor L0, a first capacitor C1, and a second capacitor C2. The inductor L0 is connected in series with the first capacitor C1, one end of the second capacitor C2 is electrically connected to an end of the inductor L0 that is not connected to the first capacitor C1, and the other end of the second capacitor C2 is electrically connected to one end of the first capacitor C1 that is not connected to the inductor L0.

Figure 16:
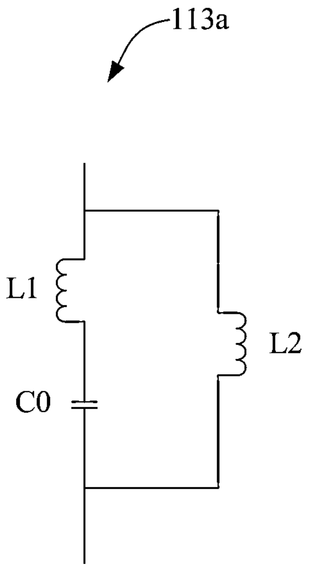

Reference is made to FIG. 16, and in FIG. 16, the frequency-selective filter sub-circuit 113*a* includes a capacitor C0, a first inductor L1, and a second inductor L2. The capacitor C0 is connected in series with the first inductor L1, one end of the second inductor L2 is electrically connected to one end of the capacitor C0 that is not connected to the first inductor L1, and the other end of the second inductor L2 is electrically connected to one end of the first inductor L1 that is not connected to the capacitor C0.

Figure 17:
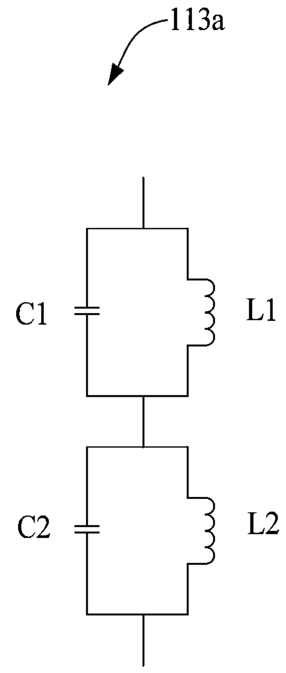

Reference is made to FIG. 17, and in FIG. 17, the frequency-selective filter circuit 113*a* includes a first capacitor C1, a second capacitor C2, a first inductor L1, and a second inductor L2. The first capacitor C1 is connected in parallel with the first inductor L1, the second capacitor C2 is connected in parallel with the second inductor L2, and one end of an entirety formed by the second capacitor C2 and the second inductor L2 connected in parallel is electrically connected to one end of an entirety formed by the first capacitor C1 and the first inductor L1 connected in parallel.

Figure 18:
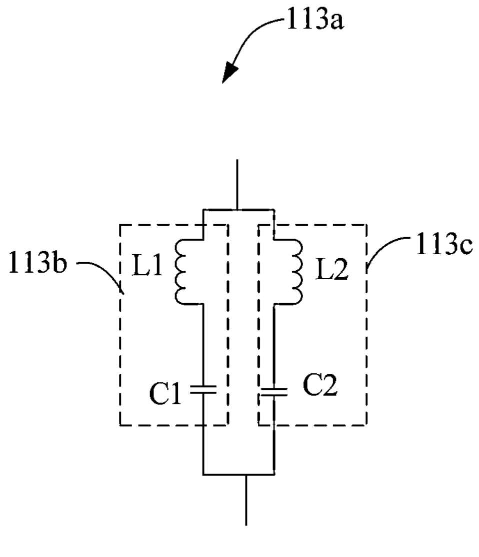

Reference is made to FIG. 18, and in FIG. 18, the frequency-selective filter sub-circuit 113*a* includes a first capacitor C1, a second capacitor C2, a first inductor L1, and a second inductor L2. The first capacitor C1 is connected in series with the first inductor L1 to form a first unit 113*b*, the second capacitor C2 is connected in series with the second inductor L2 to form a second unit 113*c*, and the first unit 113*b* is connected in parallel with the second unit 113*c*.

Figure 19:
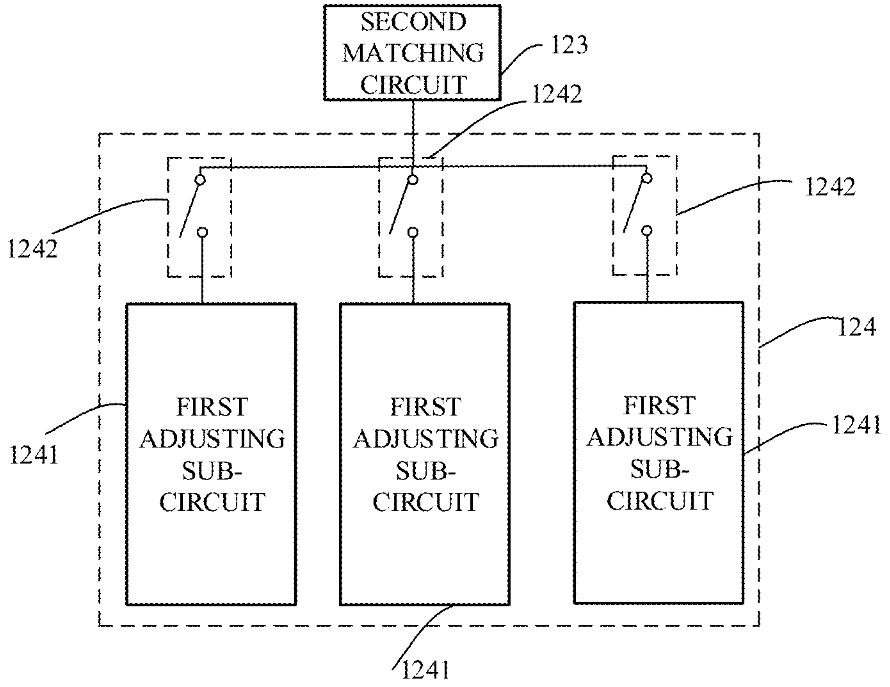
FIG. 19 is a schematic diagram of a second adjusting circuit provided in an implementation of the present disclosure.

Reference is made to FIG. 19, which is a schematic diagram of a second adjusting circuit provided in an implementation of the present disclosure. In this implementation, the second adjusting circuit 124 includes multiple adjusting sub-circuits and multiple switch units. For convenience of description, each adjusting sub-circuit included in the second adjusting circuit 124 is named as a second adjusting sub-circuit 1241, and each switch unit included in the second adjusting circuit 124 is named as a second switch unit 1242. The second switch units 1242 are configured to electrically connect at least one of the multiple second adjusting sub-circuits 1241 in the second adjusting circuit 124 to the second matching circuit 123 or the second radiator 121, under control of a control signal. In the schematic diagram of this implementation, for example, the second matching circuit 123 is connected. In the schematic diagram of this implementation, for example, the second adjusting circuit 124 includes three switch units and three second adjusting sub-circuits 1241. Each switch unit 1242 is electrically connected to a second adjusting sub-circuit 1241.

Figure 20:
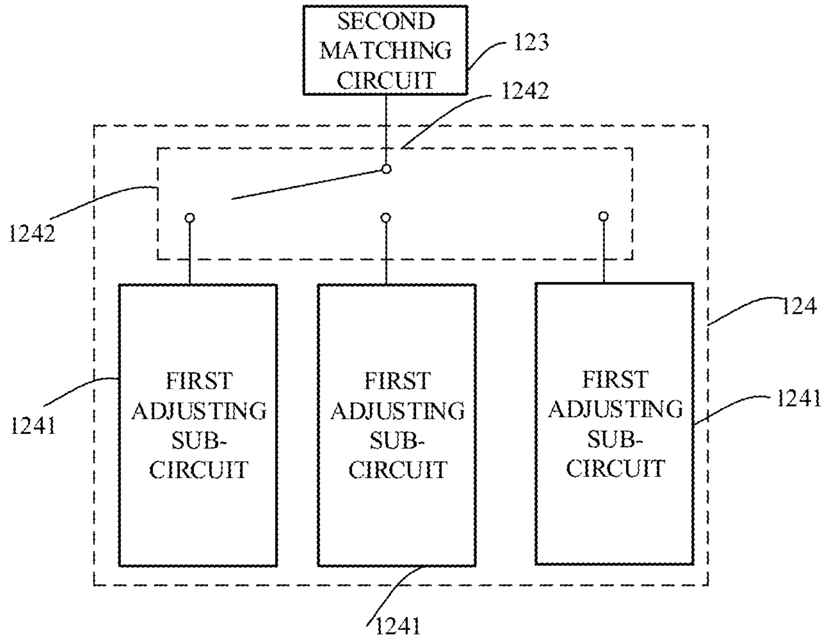
FIG. 20 is a schematic diagram of a second adjusting circuit provided in an implementation of the present disclosure.

Reference is made to FIG. 20, which is a schematic diagram of a second adjusting circuit provided in an implementation of the present disclosure. In this implementation, the second adjusting circuit 124 includes a single-pole three-throw (SP3T) switch and three second adjusting sub-circuits 1241. A movable terminal of the SP3T switch is electrically connected to the second matching circuit 123, and three fixed terminals of the SP3T switch are electrically connected to the three second adjusting sub-circuits 1241, respectively. It can be understood that, in other implementations, the second adjusting circuit 124 includes K second adjusting sub-circuits 1241. Accordingly, the second switch unit 1242 is a single-pole K-throw (SPKT) switch, or the second switch unit 1242 is a K-pole K-throw (KPKT) switch, where K is a positive integer greater than or equal to 2.

The second adjusting sub-circuit 1241 includes at least one of a capacitor, an inductor, or a resistor, or any combination thereof. Therefore, the second adjusting sub-circuit 1241 is also referred to as a lumped circuit. It can be understood that the first adjusting sub-circuit 1141 of the first adjusting circuit 114 and the second adjusting sub-circuit 1241 of the second adjusting circuit 124 may be the same or different.

Figure 21:
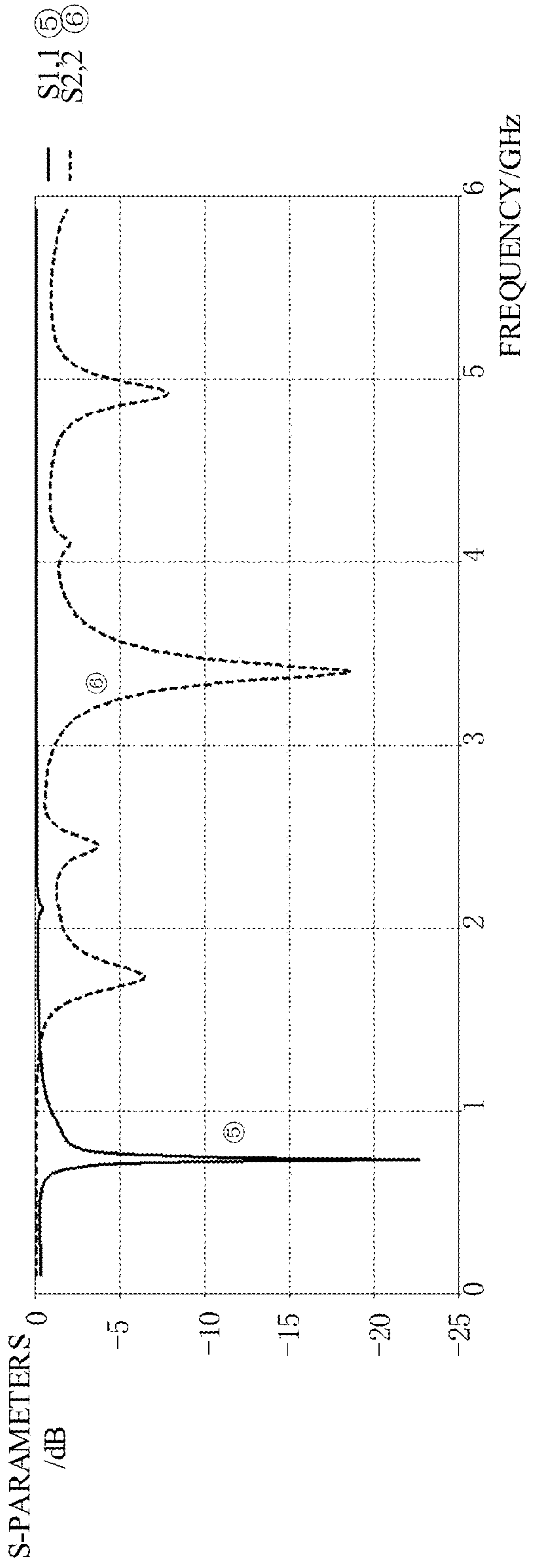
FIG. 21 is a simulation diagram of S-parameters of the antenna assembly as illustrated in FIG. 1.
Figure 22:
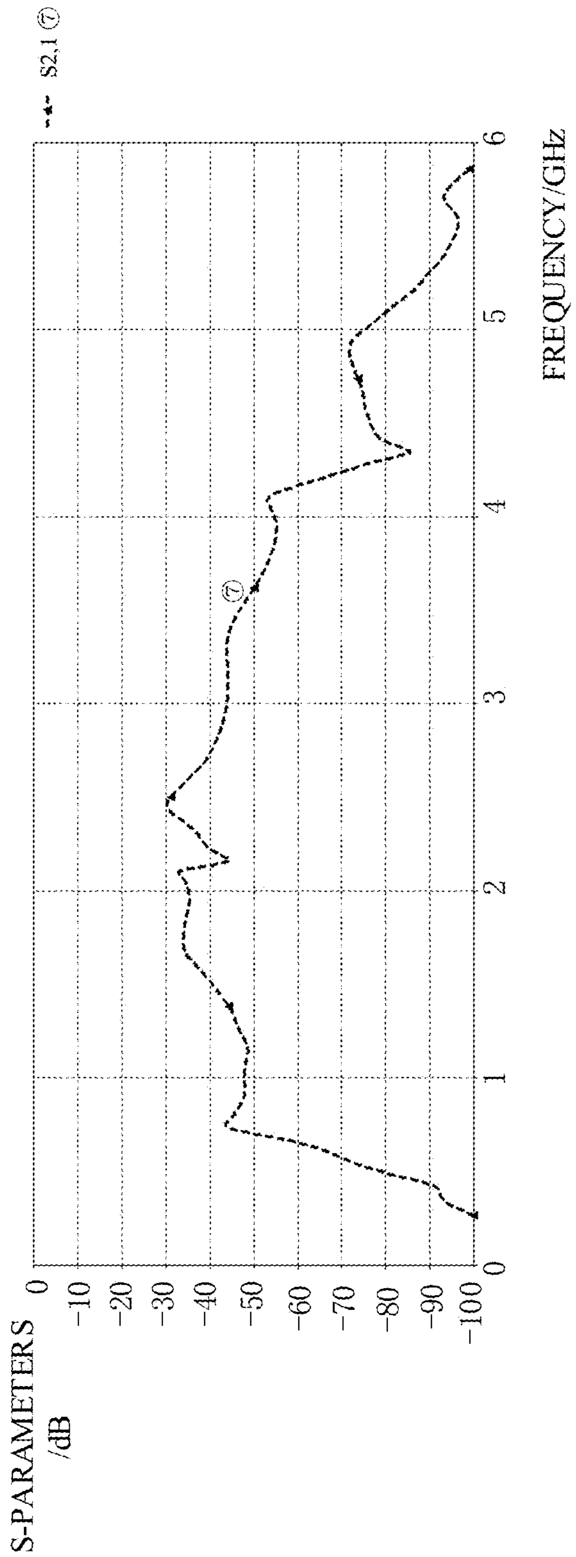
FIG. 22 is a simulation diagram of isolation of the antenna assembly as illustrated in FIG. 1.

In this implementation, the first adjusting circuit 114 and the second adjusting circuit 124 modulate together, so that the antenna assembly 10 can implement transmission/reception of an electromagnetic wave signal in the first frequency band, the second frequency band, and the third frequency band, thereby implementing carrier aggregation (CA) and ENDC in LB+MHB+UHB. Description is made below with reference to simulation diagrams. Reference is made to FIGS. 21 and 22, where FIG. 21 is a simulation diagram of S-parameters of the antenna assembly as illustrated in FIG. 1, and FIG. 22 is a simulation diagram of isolation of the antenna assembly as illustrated in FIG. 1. In FIG. 21 and FIG. 22, the abscissa represents frequency in units of GHz, the ordinate represents S-parameters in units of dB. In this simulation diagram, curve 5 represents S1,1 parameter, curve 6 represents S2,2 parameter, and curve 7 represents S2,1 parameter. It can be seen from the simulation diagram that a resonant frequency-band corresponding to curve 5 is LB, and a resonant frequency-band corresponding to curve 6 is MHB and UHB. It can be seen from curve 7 that LB has a higher isolation from MHB and UHB, respectively. In the antenna assembly 10 of the present disclosure, the first antenna 110 and the second antenna 120 are together configured to realize long term evolution (LTE) new radio (NR) double connect (ENDC) and CA in a LB+MHB+UHB (a frequency-band range of 0 MHz~6000 MHz).

In other words, the first antenna 110 and the second antenna 120 in the antenna assembly 10 are configured to implement ENDC in a range of 0 MHz~6000 MHz. It can be seen that the antenna assembly 10 of the present disclosure can realize ENDC and can support both a fourth generation mobile communications technology (4G) wireless access network and fifth generation mobile communications technology (5G)-NR. Therefore, the antenna assembly 10 provided in implementations of the present disclosure can improve a transmission bandwidth of 4G and 5G, improve uplink and downlink rates, and have a better communication effect.

In the antenna assembly 10 of the present disclosure, the first antenna 110 and the second antenna 120 are cooperatively configured to implement ENDC and CA in LB+MHB+UHB (a frequency-band range of 0 MHz~6000 MHz). Therefore, the first antenna 110 and the second antenna 120 may be cooperatively configured to implement ENDC and CA in a frequency-band range of 1000 MHz~6000 MHz. In other words, the first antenna 110 and the second antenna 120 together implement ENDC and CA in MHB+UHB.

The first radiator 111 has a first ground end 1111, a first free end 1112, a first feed point 1113, and a first connection point 1114. The first ground end 1111 is grounded, and the first free end 1112 is spaced apart from and coupled with the second radiator 121. The first feed point 1113 and the first connection point 1114 are located between the first ground end 1111 and the first free end 1112. The first signal-source 112 is electrically connected to the first feed point 1113 of the first radiator 111 through the first matching circuit 113. When the first adjusting circuit 114 is electrically connected to the first radiator 111, the first adjusting circuit 114 is electrically connected to the first connection point 1114 of the first radiator 111, where the first connection point 1114 is located between the first ground end 1111 and the first feed point 1113, or the first connection point 1114 is located between the first feed point 1113 and the first free end 1112.

Correspondingly, the second radiator 121 has a second ground end 1121, a second free end 1122, a second feed point 1213, and a second connection point 1214. The second ground end 1121 is grounded, and the second free end 1122 is spaced apart from and coupled with the first radiator 111. The first free end 1112 of the first radiator 111 is spaced apart from and coupled with the second free end 1122 of the second radiator 121. The second feed point 1213 and the second connection point 1214 are located between the second ground end 1121 and the second free end 1122. The second signal-source 122 is electrically connected to the second feed point 1213 of the second radiator 121 through the second matching circuit 123. When the second adjusting circuit 124 is electrically connected to the second radiator 121, the second adjusting circuit 124 is electrically connected to the second connection point 1214 of the second radiator 121, where the second connection point 1214 is located between the second ground end 1121 and the second feed point 1213, or the second connection point 1214 is located between the second feed point 1213 and the second free end 1122.

Figure 23:
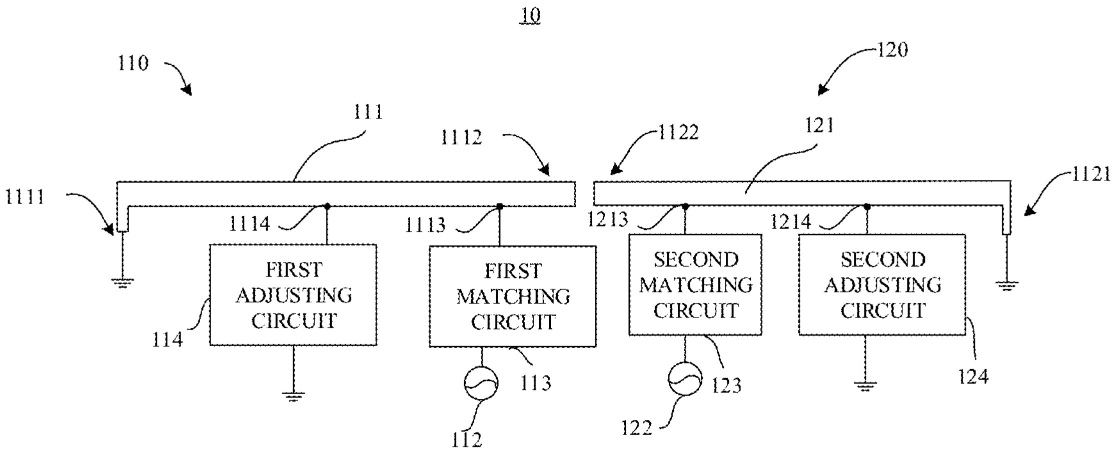
FIG. 23 is a schematic diagram of an antenna assembly provided in another implementation of the present disclosure.
Figure 24:
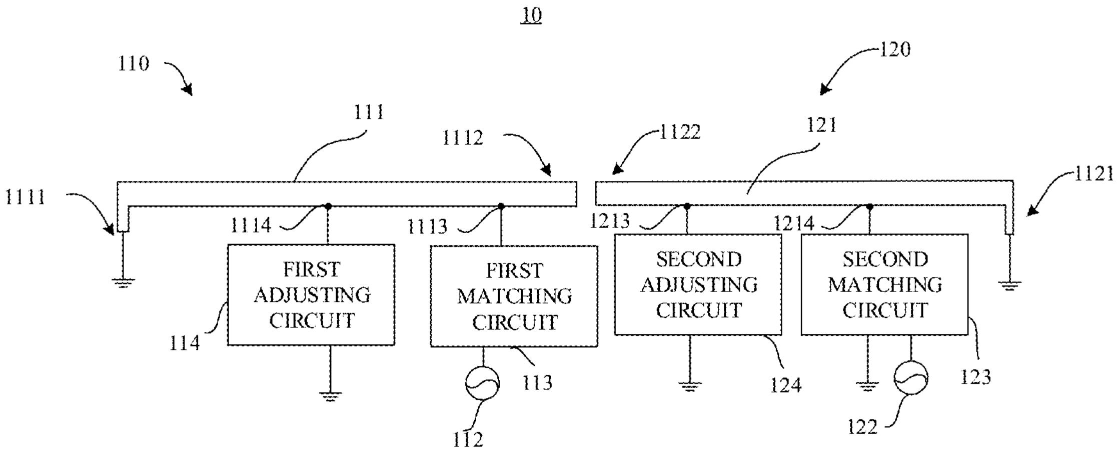
FIG. 24 is a schematic diagram of an antenna assembly provided in another implementation of the present disclosure.
Figure 25:
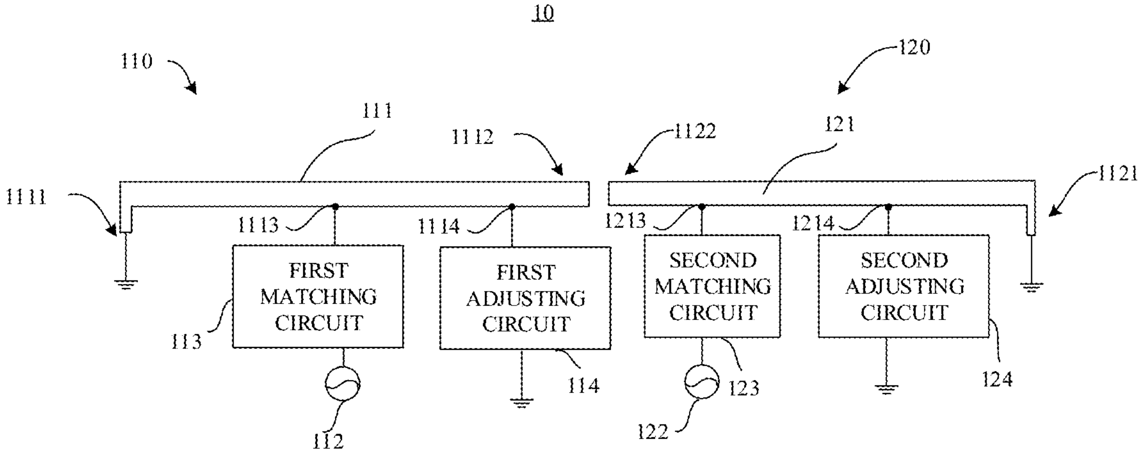
FIG. 25 is a schematic diagram of an antenna assembly provided in another implementation of the present disclosure.

The first connection point 1114 is located between the first ground end 1111 and the first feed point 1113, or the first connection point 1114 is located between the first feed point 1113 and the first free end 1112. The second adjusting circuit 124 is electrically connected to the second connection point 1214 of the second radiator 121, where the second connection point 1214 is located between the second ground end 1121 and the second feed point 1213, or the second connection point 1214 is located between the second feed point 1213 and the second free end 1122. Therefore, positions of the first connection point 1114 and the second connection point 1214 in the antenna assembly 10 may include any combination of the following. The first connection point 1114 is located between the first ground end 1111 and the first feed point 1113, and the second connection point 1214 is located between the second ground end 1121 and the second feed point 1213 (see FIG. 23); or the first connection point 1114 is located between the first ground end 1111 and the first feed point 1113, and the second connection point 1214 is located between the second feed point 1213 and the second free end 1122 (see FIG. 24); or the first connection point 1114 is located between the first feed point 1113 and the first free end 1112, and the second connection point 1214 is located between the second ground end 1121 and the second feed point 1213 (see FIG. 25); or, the first connection point 1114 is located between the first feed point 1113 and the first free end 1112, and the second connection point 1214 is located between the second feed point 1213 and the second free end 1122 (see FIG. 4).

When the first connection point 1114 is located between the first feed point 1113 and the first free end 1112, an influence of an electromagnetic wave signal (an electromagnetic wave signal in the first frequency band and an electromagnetic wave signal supported by the first resonant mode) generated by the first radiator 111 on electromagnetic wave signals in other frequency bands supported by the antenna assembly 10 for receiving and transmitting can be reduced. It can be understood that, the first connection point

1114 may also be located between the first feed point 1113 and the first ground end 1111, as long as the first adjusting circuit 114 can be electrically connected to the first radiator 111.

When the second connection point 1214 is located between the second feed point 1213 and the second free end 1122, an influence of an electromagnetic wave signal generated by the second radiator 121 on electromagnetic wave signals in other frequency bands supported by the antenna assembly 10 for receiving and transmitting can be reduced. It can be understood that, the second connection point 1214 may also be located between the second feed point 1213 and the second ground end 1121, as long as the second adjusting circuit 124 can be electrically connected to the second radiator 121.

Figure 26:
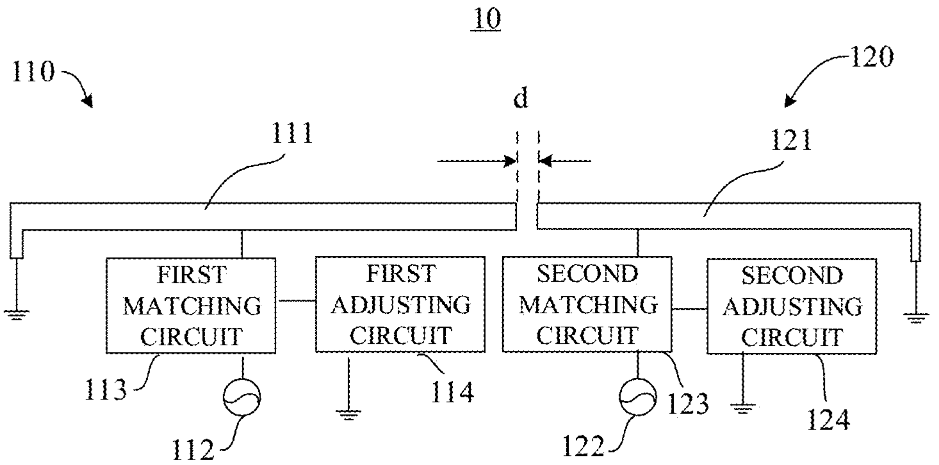
FIG. 26 is a schematic diagram illustrating a dimension of a gap between a first radiator and a second radiator in an antenna assembly provided in an implementation of the present disclosure.

Reference is made to FIG. 26, FIG. 26 is a schematic diagram illustrating a dimension of a gap between the first radiator and the second radiator in the antenna assembly provided in an implementation of the present disclosure. The dimension d of the gap between the first radiator 111 and the second radiator 121 satisfies: 0.5 mm≤d≤1.5 mm.

It can be understood that, for the antenna assembly 10, the gap between the first antenna 110 radiator and the second antenna 120 radiator in the antenna assembly 10 always meet: 0.5 mm≤d≤1.5 mm. Thus, a better coupling effect between the first radiator 111 and the second radiator 121 may be ensured. In this implementation, for illustrative purpose, the sizes of the first radiator 111 and the second radiator 121 in the antenna assembly 10 are illustrated in the antenna assembly 10 as illustrated in FIG. 1, however, it should not be understood as a limitation to the present disclosure, and the gap between the first radiator 111 and the second radiator 121 is also applicable to the antenna assembly 10 provided in other implementations.

Figure 27:
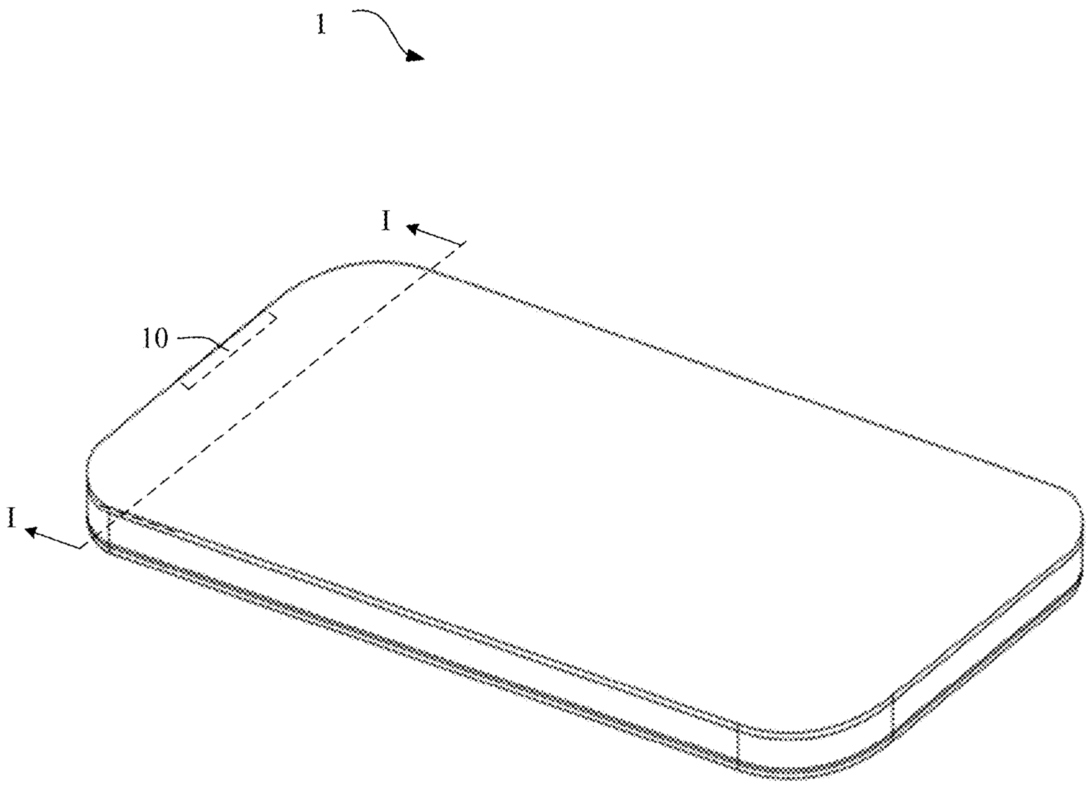
FIG. 27 is a three-dimensional structural diagram of an electronic device provided in an implementation of the present disclosure.

Reference is made to FIG. 27, which is a three-dimensional structural diagram of an electronic device provided in an implementation of the present disclosure. The electronic device 1 includes the antenna assembly 10 according to any foregoing implementation.

Figure 28:
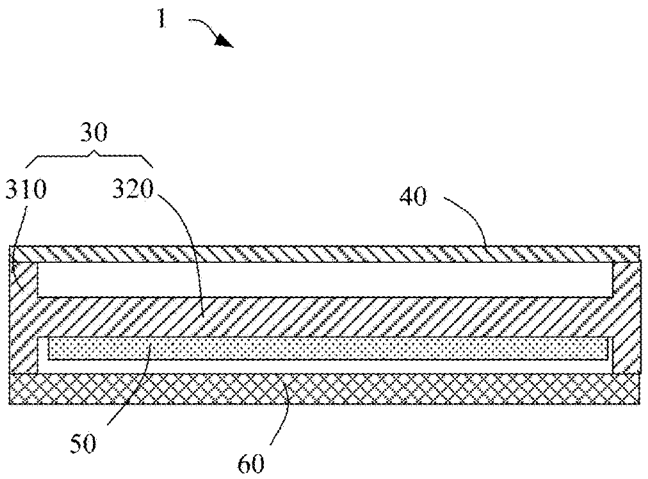
FIG. 28 is a cross-sectional view taken along line I-I in FIG. 27 provided in an implementation.

Reference is made to FIG. 28, which is a cross-sectional view taken along line I-I in FIG. 27 provided in an implementation. In this implementation, the electronic device 1 further includes a middle frame 30, a screen 40, a circuit board 50, and a battery cover 60. The middle frame 30 is made of metal, such as aluminum magnesium alloy. The middle frame 30 generally serves as the ground of the electronic device 1. When electronic components in the electronic device 1 need to be grounded, the electronic components may be connected to the middle frame 30 to be grounded. In addition, a ground system in the electronic device 1 not only includes the middle frame 30, but also includes a ground on the circuit board 50 and a ground in the screen 40. The screen 40 may be a display screen with a display function, and may also be a screen 40 integrated with a display function and a touch control function. The screen 40 is configured to display information such as a text, an image, and a video. The screen 40 is carried on the middle frame 30 and disposed on one side of the middle frame 30. The circuit board 50 is also generally carried on the middle frame 30, and the circuit board 50 and the screen 40 are carried on two opposite sides of the middle frame 30. At least one or more of the first signal-source 112, the second signal-source 122, the first matching circuit 113, the second matching circuit 123, the first adjusting circuit 114, and the second adjusting circuit 124 in the antenna assembly 10 described above may be disposed on the circuit board 50. The battery cover 60 is disposed on one side of the circuit board 50 away from the middle frame 30. The battery cover 60, the middle frame 30, the circuit board 50, and the screen 40 cooperate with each other to form a complete electronic device 1. It should be understood that, the structural description of the electronic device 1 is only a description of one form of the structure of the electronic device 1, should not be understood as a limitation to the electronic device 1, and should not be understood as a limitation to the antenna assembly 10.

When the first radiator 111 is electrically connected to the ground of the middle frame 30, the first radiator 111 may be connected to the ground of the middle frame 30 through a connecting bar, or the first radiator 111 may also be electrically connected to the ground of the middle frame 30 through a conductive elastic sheet. Likewise, when the second radiator 121 is electrically connected to the ground of the middle frame 30, the second radiator 121 may also be connected to the ground of the middle frame 30 through a connecting rib, or the second radiator 121 may also be electrically connected to the ground of the middle frame 30 through a conductive elastic sheet.

The middle frame 30 includes a frame body 310 and an edge frame 320. The edge frame 320 is bendably connected to a periphery of the frame body 310. Any of the first radiator 111, the second radiator 121, the third radiator 131, or the fourth radiator 141 in the foregoing implementations may be formed on the edge frame 320.

It should be understood that, in other implementations, the first radiator 111 and the second radiator 121 may also be formed on the edge frame 320, or the first radiator 111 and the second radiator 121 each may be a FPC antenna radiator, a LDS antenna radiator, a PDS antenna radiator, or a metal branch.

Figure 29:
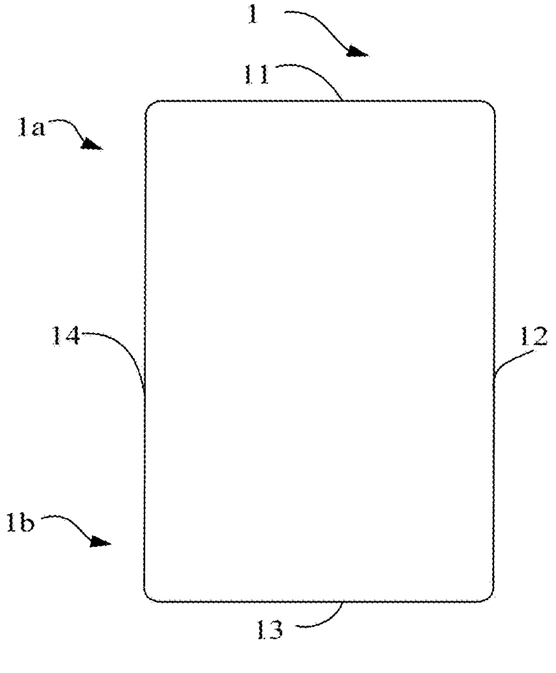
FIG. 29 is a schematic diagram illustrating positions in an electronic device provided in an implementation.

Reference is made to FIG. 29, which is a schematic diagram illustrating positions in an electronic device provided in an implementation. In this implementation, the electronic device 1 includes a top portion 1*a* and a bottom portion 1*b*, and the first radiator 111 and the second radiator 121 are both disposed on the top portion 1*a*.

The top portion 1*a* refers to an upper part of the electronic device 1 when the electronic device 1 is in use, and the bottom portion 1*b* is opposite to the top portion 1*a* and refers to a lower part of the electronic device 1.

The electronic device 1 in this implementation includes a first side 11, a second side 12, a third side 13, and a fourth side 14 that are sequentially connected to one another end to end. The first side 11 and the third side 13 are short sides of the electronic device 1, and the second side 12 and the fourth side 14 are long sides of the electronic device 1. The first side 11 and the third side 13 are opposite to each other and spaced apart from each other, the second side 12 and the fourth side 14 are opposite to each other and spaced apart from each other. The second side 12 is connected to the first side 11 and the third side 13 in a bending manner, and the fourth side 14 is connected to the first side 11 and the third side 13 in a bending manner. A connection between the first side 11 and the second side 12, a connection between the second side 12 and the third side 13, a connection between the third side 13 and the fourth side 14, and a connection between the fourth side 14 and the first side 11 all form corners of the electronic device 1. The first side 11 is a top side, the second side 12 is a right side, the third side 13 is a lower side, and the fourth side 14 is a left side. The first side 11 and the second side 12 define an upper right corner, and the first side 11 and the fourth side 14 define an upper left corner.

The top portion 1*a* includes three cases: the first radiator 111 and the second radiator 121 are disposed at the upper left corner of the electronic device 1; or, the first radiator 111 and the second radiator 121 are disposed at the top side of the electronic device 1; or the first radiator 111 and the second radiator 121 are disposed at the upper right corner of the electronic device 1.

The first radiator 111 and the second radiator 121 being disposed at the upper left corner of the electronic device 1 includes following cases: part of the first radiator 111 is disposed at the left side, the other part of the first radiator 111 is disposed at the top side, and the second radiator 121 is disposed at the top side; or, part of the second radiator 121 is disposed at the top side, the other part of the second radiator 121 is disposed at the left side, and the first radiator 111 is disposed at the left side.

The first radiator 111 and the second radiator 121 being disposed at the upper right corner of the electronic device 1 includes following cases: part of the first radiator 111 is disposed at the top side, the other part of the first radiator 111 is disposed at the right side, and the second radiator 121 is disposed at the right side; or, part of the second radiator 121 is disposed at the right side, the other part of the second radiator 121 is disposed at the top side, and part of the first radiator 111 is disposed at the top side When the electronic device 1 is placed upright, the top portion 1*a* of the electronic device 1 is usually away from the ground, and the bottom portion 1*b* of the electronic device 1 is usually close to the ground. When the first radiator 111 and the second radiator 121 are disposed on the top portion 1*a*, upper hemisphere radiation efficiency of the first antenna 110 and the second antenna 120 is better, so that the first antenna 110 and the second antenna 120 have better communication efficiency. Certainly, in other implementations, the first radiator 111 and the second radiator 121 may also be disposed on the bottom portion 1*b* of the electronic device 1, When the first radiator 111 and the second radiator 121 are disposed on the bottom portion 1*b* of the electronic device 1, the first antenna 110 and the second antenna 120 do not have good upper hemisphere radiation efficiency, but the first antenna 110 and the second antenna 120 may also have good communication effect as long as the upper hemisphere radiation efficiency is greater than or equal to the preset efficiency.

Although implementations of the present disclosure have been illustrated and described above, it should be understood that the above implementations are illustrative and cannot be construed as limitations to the present disclosure. Those skilled in the art can make changes, modifications, replacements, and variations to the above implementations within the scope of the present disclosure, and these changes and modifications shall also belong to the scope of protection of the present disclosure.

What is claimed is:

1. An antenna assembly comprising:

a first antenna comprising a first radiator, a first signal-source, a first matching circuit, and a first adjusting circuit, wherein the first signal-source is electrically connected to the first radiator through the first matching circuit, and the first adjusting circuit is electrically connected to the first matching circuit or the first radiator, and configured to adjust a resonant frequency-point of the first antenna to make the first antenna support transmission/reception of an electromagnetic wave signal in a first frequency band; and a second antenna comprising a second radiator, a second signal-source, a second matching circuit, and a second adjusting circuit, wherein the second signal-source is electrically connected to the second radiator through the second matching circuit, and the second adjusting circuit is electrically connected to the second matching circuit or the second radiator, and configured to adjust a resonant frequency-point of the second antenna to make the second antenna support transmission/reception of an electromagnetic wave signal in a second frequency band and a third frequency band;

wherein the antenna assembly has a first resonant mode, a second resonant mode, a third resonant mode, and a fourth resonant mode; the first resonant mode is a ⅛ wavelength mode of the second antenna, the second resonant mode is a ¼ wavelength mode from the first adjusting circuit to a gap between the first radiator and the second radiator, the third resonant mode is a ¼ wavelength mode of the second antenna, and the fourth resonant mode is a ¼ wavelength mode from the second signal-source to the gap between the first radiator and the second radiator, wherein a wavelength of each resonant mode corresponds to a center frequency of said each resonant mode; and the transmission/reception of the electromagnetic wave signal in the second frequency band and the third frequency band is supported by the first resonant mode, the second resonant mode, the third resonant mode, and the fourth resonant mode.

2. The antenna assembly of claim 1, wherein the first radiator serves as a parasitic branch of the second antenna, the second radiator serves as a parasitic branch of the first antenna, the transmission/reception of the electromagnetic wave signal in the first frequency band is supported by the first antenna by using the first radiator and the second radiator, and the transmission/reception of the electromagnetic wave signal in the second frequency band and the third frequency band is supported by the second antenna by using the first radiator and the second radiator.

3. The antenna assembly of claim 1, wherein the first adjusting circuit is configured to implement low-impedance to ground of the electromagnetic wave signal in the second frequency band and the third frequency band.

4. The antenna assembly of claim 1, wherein the first frequency band comprises a lower band (LB), the second frequency band comprises a middle high band (MHB), and the third frequency band comprises an ultra-high band (UHB).

5. The antenna assembly of claim 1, wherein the first adjusting circuit is further configured to switch among frequency bands supported by the first antenna in the first frequency band.

6. The antenna assembly of claim 5, wherein the first adjusting circuit comprises a plurality of adjusting sub-circuits and a switch unit, and the switch unit is configured to electrically connect, under control of a control signal, at least one adjusting sub-circuit in the plurality of adjusting sub-circuits to the first matching circuit or the first radiator.

7. The antenna assembly of claim 6, wherein the first adjusting circuit comprises a first inductor, a second inductor, a third inductor, and a capacitor, wherein the first inductor, the second inductor, and the third inductor are different in inductance, the switch unit comprises a common terminal, a first switch sub-unit, a second switch sub-unit, a third switch sub-unit, and a fourth switch sub-unit, and the common terminal is electrically connected to the first matching circuit; the first switch sub-unit has one end electrically connected to the first inductor, and another end electrically connected to the common terminal; the second switch sub-unit has one end electrically connected to the second inductor, and another end electrically connected to the common terminal; the third switch sub-unit has one end electrically connected to the third inductor, and another end electrically connected to the common terminal; and the fourth switch sub-unit has one end electrically connected to the capacitor, and another end electrically connected to the common terminal.

8. The antenna assembly of claim 7, wherein the first matching circuit comprises a first matching inductor, a first matching capacitor, a second matching inductor, a second matching capacitor, a third matching capacitor, and a third matching inductor, the first matching inductor has one end electrically connected to the first signal-source, and another end electrically connected to the first radiator through the first matching capacitor and the second matching inductor in sequence, and a connection point between the first matching capacitor and the second matching inductor is electrically connected to the common terminal; the second matching capacitor has one end electrically connected to a connection point between the first matching inductor and the first matching capacitor, and another end grounded; the third matching capacitor has one end electrically connected to the first radiator, and another end grounded; and the third matching inductor has one end electrically connected to the first radiator, and another end grounded.

9. The antenna assembly of claim 8, wherein the third matching capacitor comprises a first matching sub-capacitor and a second matching sub-capacitor, the first matching sub-capacitor has one end electrically connected to the first radiator, and another end grounded.

10. The antenna assembly of claim 1, wherein ⅛ of a wavelength corresponding to a center frequency of the first resonant mode is the length of the second antenna, ¼ of a wavelength corresponding to a center frequency of the second resonant mode is a distance from the first adjusting circuit to the gap between the first radiator and the second radiator, ¼ of a wavelength corresponding to a center frequency of the third resonant mode is the length of the second antenna, and ¼ of a wavelength corresponding to a center frequency of the fourth resonant mode is a distance from the second signal-source to the gap between the first radiator and the second radiator.

11. The antenna assembly of claim 1, wherein the second radiator is spaced apart from and coupled with the first radiator.

12. The antenna assembly of claim 11, wherein the first radiator has a first ground end, a first free end, a first feed point, and a first connection point, the first ground end is grounded, the first free end is spaced apart from and coupled with the second radiator, the first feed point and the first connection point are located between the first ground end and the first free end, the first signal-source is electrically connected to the first feed point of the first radiator through the first matching circuit, the first adjusting circuit is electrically connected to the first radiator, and the first adjusting circuit is electrically connected to the first connection point of the first radiator; and wherein the first connection point is located between the first ground end and the first feed point, or the first connection point is located between the first feed point and the first free end.

13. The antenna assembly of claim 1, wherein the second radiator has a second ground end, a second free end, a second feed point, and a second connection point, the second ground end is grounded, the second free end is spaced apart from and coupled with the first radiator, the second feed point and the second connection point are located between the second ground end and the second free end, the second signal-source is electrically connected to the second feed point of the second radiator through the second matching circuit, the second adjusting circuit is electrically connected to the second radiator, and the second adjusting circuit is electrically connected to the second connection point of the second radiator; and wherein the second connection point is located between the second ground end and the second feed point, or the second connection point is located between the second feed point and the second free end.

14. The antenna assembly of claim 1, wherein the first matching circuit comprises one or more first frequency-selective filter sub-circuits, the second matching circuit comprises one or more second frequency-selective filter sub-circuits, and the one or more first frequency-selective filter sub-circuits and the one or more second frequency-selective filter sub-circuits are further configured to isolate the first antenna from the second antenna.

15. The antenna assembly of claim 14, wherein the one or more first frequency-selective filter sub-circuits or the one or more second frequency-selective filter sub-circuits comprise one or more of the following: a band-pass circuit formed by an inductor and a capacitor connected in series; a band-stop circuit formed by the inductor and the capacitor connected in parallel; the inductor, a first capacitor, and a second capacitor, wherein the inductor is connected in parallel with the first capacitor, and the second capacitor is electrically connected to a node where the inductor is electrically connected to the first capacitor; the capacitor, a first inductor, and a second inductor, wherein the capacitor is connected in parallel with the first inductor, and the second inductor is electrically connected to a node where the capacitor is electrically connected to the first inductor; the inductor, the first capacitor, and the second capacitor, wherein the inductor is connected in series with the first capacitor, the second capacitor has one end electrically connected to an end of the inductor that is not connected to the first capacitor, and another end electrically connected to one end of the first capacitor that is not connected to the inductor; the capacitor, the first inductor, and the second inductor, wherein the capacitor is connected in series with the first inductor, the second inductor has one end electrically connected to one end of the capacitor that is not connected to the first inductor, and another end electrically connected to one end of the first inductor that is not connected to the capacitor; the first capacitor, the second capacitor, the first inductor, and the second inductor, wherein the first capacitor is connected in parallel with the first inductor, the second capacitor is connected in parallel with the second inductor, and one end of an entirety formed by the second capacitor and the second inductor connected in parallel is electrically connected to one end of an entirety formed by the first capacitor and the first inductor connected in parallel; or the first capacitor, the second capacitor, the first inductor, and the second inductor, wherein the first capacitor and the first inductor are connected in series to form a first unit, the second capacitor and the second inductor are connected in series to form a second unit, and the first unit and the second unit are connected in parallel.

16. The antenna assembly of claim 1, wherein long term evolution (LTE) new radio (NR) double connect (ENDC) and carrier aggregation (CA) in a frequency-band range of 1000 MHz~6000 MHz is implemented by the first antenna and the second antenna.

17. The antenna assembly of claim 1, wherein a dimension d of the gap between the first radiator and the second radiator satisfies: 0.5 mm≤d≤1.5 mm.

18. An electronic device comprising an antenna assembly, wherein the antenna assembly comprises:

a first antenna comprising a first radiator, a first signal-source, a first matching circuit, and a first adjusting circuit, wherein the first signal-source is electrically connected to the first radiator through the first matching circuit, and the first adjusting circuit is electrically connected to the first matching circuit or the first radiator, and configured to adjust a resonant frequency-point of the first antenna to make the first antenna support transmission/reception of an electromagnetic wave signal in a first frequency band; and a second antenna comprising a second radiator, a second signal-source, a second matching circuit, and a second adjusting circuit, wherein the second signal-source is electrically connected to the second radiator through the second matching circuit, and the second adjusting circuit is electrically connected to the second matching circuit or the second radiator, and configured to adjust a resonant frequency-point of the second antenna to make the second antenna support transmission/reception of an electromagnetic wave signal in a second frequency band and a third frequency band;

wherein the antenna assembly has a first resonant mode, a second resonant mode, a third resonant mode, and a fourth resonant mode; the first resonant mode is a ⅛ wavelength mode of the second antenna, the second resonant mode is a ¼ wavelength mode from the first adjusting circuit to a gap between the first radiator and the second radiator, the third resonant mode is a ¼ wavelength mode of the second antenna, and the fourth resonant mode is a ¼ wavelength mode from the second signal-source to the gap between the first radiator and the second radiator, wherein a wavelength of each resonant mode corresponds to a center frequency of said each resonant mode; and the transmission/reception of the electromagnetic wave signal in the second frequency band and the third frequency band is supported by the first resonant mode, the second resonant mode, the third resonant mode, and the fourth resonant mode.

19. The electronic device of claim 18, wherein the electronic device comprises a middle frame, the middle frame comprises a frame body and an edge frame, the edge frame is bendably connected with a periphery of the frame body; and one of the first radiator of the first antenna and the second radiator of the second antenna in the antenna assembly is formed on the edge frame.

20. The electronic device of claim 18, wherein the electronic device comprises a top portion and a bottom portion, and the first radiator and the second radiator are both disposed on the top portion.

* * * * *